United States Patent [19]
Takaoka

[11] Patent Number: 6,137,905
[45] Date of Patent: Oct. 24, 2000

[54] SYSTEM FOR DISCRIMINATING DOCUMENT ORIENTATION

[75] Inventor: Makoto Takaoka, Yokohama, Japan

[73] Assignee: Canon Kabushiki Kaisha, Tokyo, Japan

[21] Appl. No.: 08/703,475

[22] Filed: Aug. 28, 1996

[30] Foreign Application Priority Data

| Aug. 31, 1995 | [JP] | Japan | 7-223591 |
| Oct. 18, 1995 | [JP] | Japan | 7-269826 |

[51] Int. Cl.[7] ............................................. G06K 9/34
[52] U.S. Cl. .......................... 382/173; 382/175; 382/289; 382/296
[58] Field of Search .................. 382/289, 290, 382/291, 292, 296, 297, 173, 299, 112, 113, 175, 176, 177, 180

[56] References Cited

U.S. PATENT DOCUMENTS

| 4,717,971 | 1/1988 | Sawyer | 358/342 |
| 5,235,651 | 8/1993 | Nafarieh | 382/46 |
| 5,272,765 | 12/1993 | Tanaka et al. | 382/13 |
| 5,301,036 | 4/1994 | Barrett et al. | 358/448 |
| 5,335,290 | 8/1994 | Cullen et al. | 382/9 |
| 5,555,362 | 9/1996 | Yamashita et al. | 395/145 |
| 5,563,966 | 10/1996 | Ise et al. | 382/317 |

Primary Examiner—Christopher S. Kelley
Assistant Examiner—Kanji Patel
Attorney, Agent, or Firm—Fitzpatrick, Cella, Harper & Scinto

[57] ABSTRACT

Document image data entered from a scanner are separated into a plurality of areas by an area separation unit. Attributes are assigned to respective ones of the plurality of partial areas obtained in the area separation unit. For instance, a character area in the main body of text and a character area in a table are examples of area attributes. Each of these attributes is assigned a degree of priority in advance. A character recognition/orientation discrimination unit detects character orientation in each of the plurality of partial areas and discriminates document orientation. The orientation of the document image data is determined based upon the document orientation of each partial area discriminated by the character recognition/orientation discrimination unit and the degree of priority of the attribute assigned to each partial area. Further, first and second recognition units for recognizing characters used in the Japanese and English languages, respectively, are provided, and the image data undergo recognition by each of these recognition units. The recognition rate of each result of recognition is obtained, the recognition rates are judged by a decision unit and one of the results is selected by a selector based upon the judgment made. The selected result of recognition is outputted.

16 Claims, 35 Drawing Sheets

DIRECTION VECTOR INFORMATION

1:
2:
3:
4:

FIG. 7A
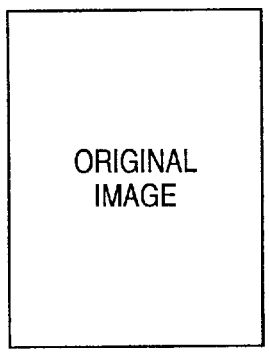
FIG. 7B
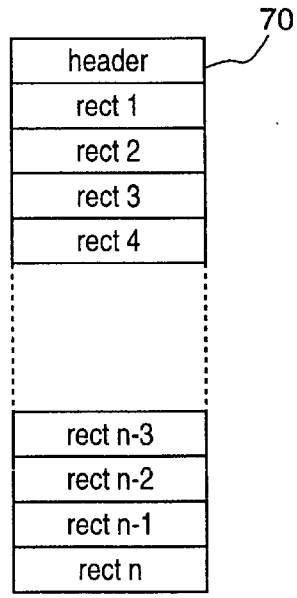
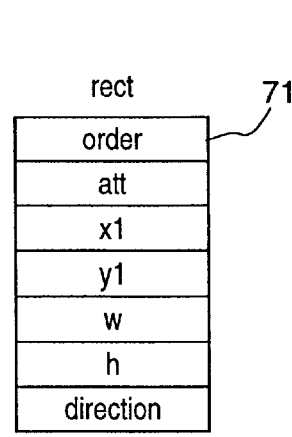
FIG. 7C
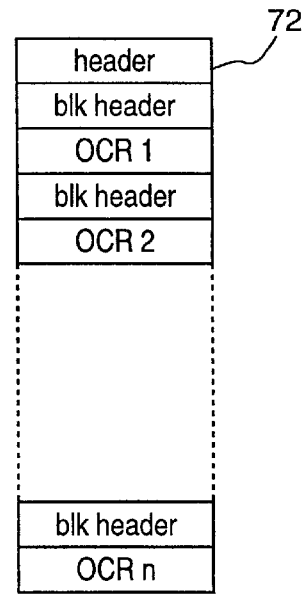
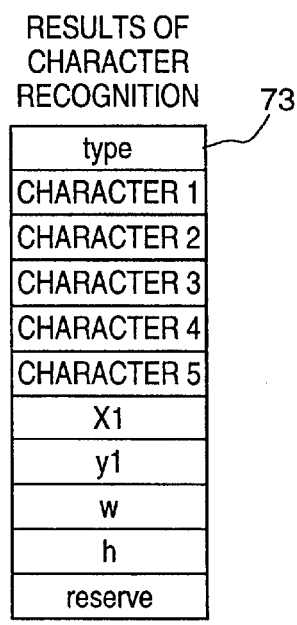

FIG. 18A

```
struct BLOCK {
    short type ; / *0=TYTLE, 1=TEXT,
                2=FIGURE, 3=PICTURE* /
    short startx,starty ;
    short width,height ;
    struct BLOCK*next_address ;
} BLOCK ;
```

FIG. 18B

```
BLK [0].type=0 ;
    .startx=500 ;
    .starty=300 ;
    .width=1500 ;
    .height=250 ;
    .next_address=&BLK [1].type BLK [1].type=1 ;
    .startx=1400 ;
    .starty=1000 ;
    .width=1450 ;
    .height=250 ;
    .next_address=&BLK [2].type BLK [2].type=2 ;
    .startx=150 ;
    .starty=1300 ;
    .width=1500 ;
    .height=1400 ;
    .next_address=&BLK [3].type BLK [3].type=1 ;
    .startx=1700 ;
    .starty=1500 ;
    .width=1000 ;
    .height=800 ;
    .next_address=&BLK [4].type BLK [4].type=1 ;
    .startx=100 ;
    .starty=2900 ;
    .width=2800 ;
    .height=1200 ;
    .next_address=NULL
```

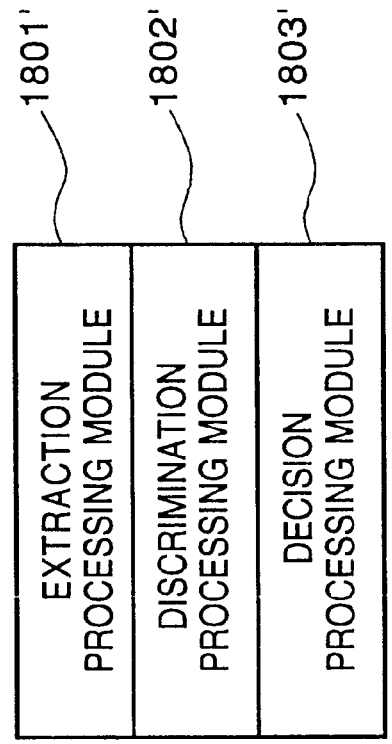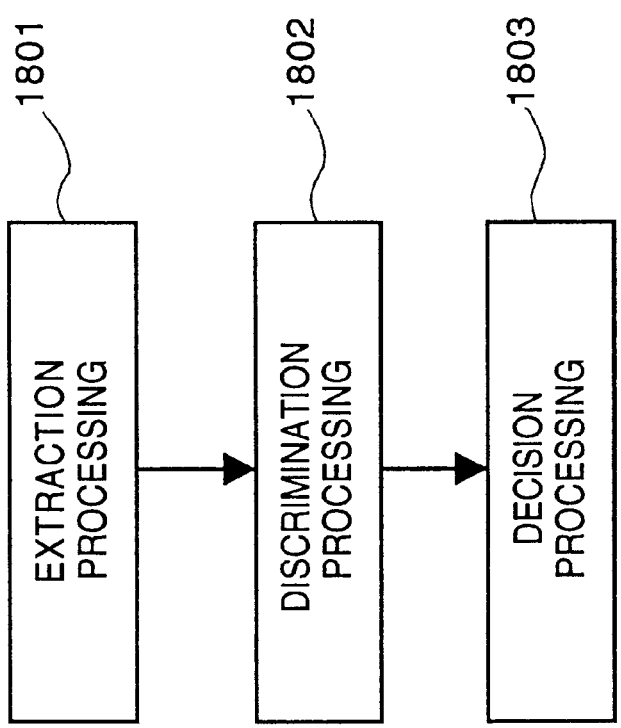

F I G. 33B
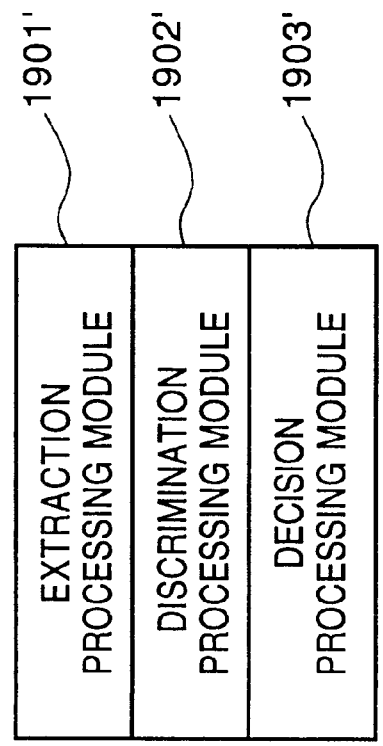
F I G. 33A
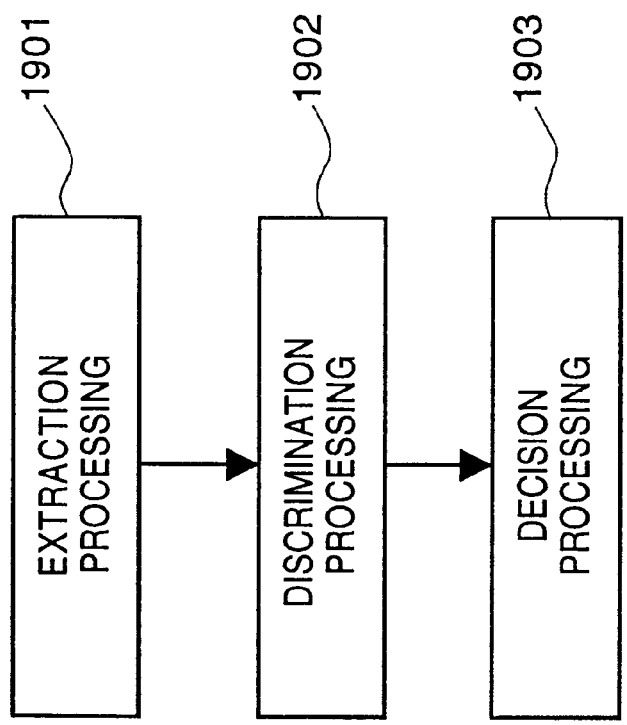

SYSTEM FOR DISCRIMINATING DOCUMENT ORIENTATION

BACKGROUND OF THE INVENTION

This invention relates to a document orientation discrimination apparatus and method for discriminating the orientation of a document based upon image data obtained by optically reading the document. The invention relates also to a character recognition apparatus and method for recognizing characters in the image data.

A reading device used in character recognition processing to optically read a manuscript in accordance with the prior art acquires image data using a so-called scanner and subjects the image data to character recognition. If the image data happen to be read upon being rotated by 90 or 180°, completely different codes are outputted as the result of character recognition. Though the acquired image data does undergo character recognition, the orientation of the characters is incorrect, as a consequence of which the results of character recognition are rendered incoherent.

Accordingly, in order that character recognition may be performed correctly when the orientation of the document is improper, a person corrects the direction in which the manuscript is read and re-enters the manuscript so that recognition processing will be performed correctly. However, it is now required that the apparatus be provided with a function for automatically discriminating/rotating the orientation of the document for the following two reasons: (1) Since scanners execute processing at higher speeds and have begun to be equipped with an automatic document feeding function referred to as an autofeeder, there has been an increase in the processing of large numbers of manuscripts, and it is difficult for an individual to correct manuscript orientation one manuscript at a time. (2) In the case of a scanner for size A4 paper, there is only one way the manuscript can be placed in the apparatus.

FIG. 26, consisting of FIGS. 26A and 26B, is a diagram for describing a typical technique used to discriminate document orientation automatically. FIG. 26A illustrates a method according to which the results of area separation are used to extract a section 1000 having lines, as in a chart or table, the orientation of the section is observed (as by using the fact that the section is divided by long lines in the transverse direction) and the orientation of the document is recognized based upon the observation made. In another method, shown in FIG. 26B, projection (histograms 1001) in the longitudinal and transverse directions are detected, and orientation is judged by observing the breaks in the histograms (e.g., the shorter breaks in the histogram are adopted as being indicative of the transverse direction). Alternatively, the document is separated into areas, and the orientation of the document is discriminated based upon the transverse and longitudinal lengths of rectangular areas 1002 matched to the features of the character areas.

Whether the document is oriented in the transverse direction or longitudinal direction is discriminated based upon the results of discrimination obtained by the methods described above. The image is rotated as necessary. The rotated image is then subjected to character recognition processing, and the results of recognition are obtained.

Expectations for character recognition have risen in recent years owing to the growing demand for the handling of greater quantities of documents. Character recognition units are now used in electronic filing and desktop publishing and are installed in apparatus such as copiers where large quantities of documents are processed. The character recognition apparatus makes it possible for characters contained in a document written on paper to be utilized in retrieval and to be processed by desktop publishing software.

Thus, as mentioned above, various automating techniques that do not require human intervention have been developed for character recognition apparatus. Techniques for automatically correcting document orientation are particularly important.

The conventional character recognition apparatus described above has the following drawbacks:

(1) Characters undergo recognition erroneously when the document has been entered in the wrong orientation.

(2) In a case where read image data are oriented on their side or upside down, confirmation by monitor or the like is difficult.

(3) Discrimination of document orientation is not accurate enough in general.

(4) Discrimination of orientation is not accurate enough, in particular, with regard to documents in which characters having different orientations are mixed.

These difficulties will now be described in simple terms.

(1) Occurrence of erroneous recognition due to difference in character orientation FIG. 27, consisting of FIGS. 27A and 27B, is a diagram illustrating results of recognition in various directions in a case where the character "M" has had its reading direction rotated. It should be noted that FIG. 27 is merely an example and that the results of erroneous recognition are not necessarily as illustrated. FIG. 27 illustrates instances in which recognition is erroneous or is incapable of being performed. More specifically, FIG. 27B shows "E" as the result of recognition in a case where the reading direction of the character "M" has been rotated by 270°, and FIG. 27C shows "W" as the result of recognition in a case where the reading direction of the character "M" has been rotated by 180°. FIG. 27D shows "Z" as the result of recognition in a case where the reading direction of the character "M" has been rotated by 90°. Thus, character recognition is performed on the assumption that characters are oriented correctly, and character candidates are selected from the features obtained by recognition. If the reading direction is rotated, therefore, the results of recognition will be erroneous.

(2) Occurrence of difficulties when confirmation of image data is performed by monitor FIG. 28, consisting of FIGS. 28A and 28B, is a diagram showing the manner in which image data, which have been read in by a scanner or the like, are displayed on a screen. FIG. 28A shows an example of a display in a case where a document of size A4 in the longitudinal direction has been read upon being placed longitudinally. Here the display is normal. FIG. 28B shows an example of a display in a case where a document of size A4 in the longitudinal direction has been read upon being placed on its side. When viewed by a person, the document appears as an image that has been rotated by 90°. This happens because of the relationship between the manner in which the document is written on paper (the document orientation) and the manner in which the manuscript is placed when the image thereof is entered from the scanner.

FIG. 29, consisting of FIGS. 29A and 29B, is a diagram for describing various dispositions of documents on paper. FIG. 29 describes various ways in which a document is arranged on paper. FIG. 29A shows an A4 document arranged longitudinally. This is a document form often used for writing Japanese characters horizontally and for writing English documents. FIG. 29B shows an A4 document on its side. This is a document form in which the individual lines are long, a document form often used when making a reduced copy of a size A3 or B4 document. FIG. 29C shows an A4 document turned on its side and divided down the center. This is a document form often used in a case where reduced-size copies are made of two size A4 documents in continuous fashion. FIG. 29D shows a vertically oriented A4 document in which characters are written vertically.

Scanners employ a variety of reading methods depending upon the type of machine. Examples of scanners are a flat-bed scanner in which manuscripts up to size A4 can be entered, and a scanner of the type in which a size A4 manuscript is slid and read in longitudinally. In such scanners the manuscript reading direction is uniquely decided. Depending upon the way the document is placed, therefore, the document orientation may be read in improperly.

There are also systems in which a manuscript is read by utilizing the scanner of a copier. Such a scanner offers a comparatively high degree of freedom in regard to how the manuscript to be read is placed. As a result, it is possible for an individual to place the manuscript in the correct orientation when entering the image. In particular, when a document having a large number of pages is read, it is possible for the manuscripts to be fed in automatically by an autofeeder and then read. However, when a document is introduced using an autofeeder, some images will be entered in the improper orientation if some pages in the document are improperly oriented or if documents having different text layouts are included.

A display having an abnormal orientation will result, as shown in FIG. 28, consisting of FIGS. 28A and 28B, for the reasons set forth above. In such case it will be necessary to rotate the image to the correct orientation.

(3) Accuracy of document orientation discrimination

A high degree of accuracy is essential to discriminate the orientation of a document. Judgment using the lines of a table or chart contained in a document as in the aforementioned example of the prior art can result in mistaken discrimination of direction if a document does not have a table or chart or if the document contains mixed horizontal and vertical lines. In the case of the longitudinal and horizontal projections, direction of rotation can be detected comparatively accurately if the document has characters only and lines or paragraphs are clearly defined. In case of a document containing figures or natural pictures, there is the possibility that orientation will be discriminated incorrectly. Furthermore, it is difficult to distinguish between 0° and 180° and between 90° and 270°, so the accuracy of orientation discrimination is poor.

(4) Occurrence of erroneous recognition of orientation in document having mixture of characters of different orientations FIG. 30, consisting of FIGS. 30A, B and C, is a diagram showing examples of documents in which one page of the manuscript contains a mixture of characters having different orientations. FIG. 30A illustrates a document having characters in the normal direction and characters in a direction different from the normal direction. Here the document contains characters describing a graph 1010. FIGS. 30B and C illustrate documents in which a single page of the manuscript is obtained by reducing the size of two pages of an original. One side of the document has characters arranged vertically and other side of the document has characters arranged horizontally. Here the results of judging orientation differ depending upon which orientation of the characters in the document is used to judge the orientation of the document.

In a case where the conventional character recognition apparatus described above is used independently to recognize characters of a plurality of types in different languages, each language cannot be recognized correctly owing to differences in the characteristics of the languages. For example, if the letters of the alphabet undergo character recognition using an OCR dedicated to the Japanese language, lowercase alphabetic characters cannot be recognized since the characteristics thereof are so much different from those of the Japanese language.

Accordingly, in order for a plurality of languages to be recognized by a single reading device, a recognition algorithm is provided for each language and the user employs an input unit to switch among the recognition algorithms corresponding to the languages. This allows highly precise character recognition to be performed. Further, it is required that a dictionary of each language be stored in the device even for one and the same algorithm. Whenever recognition is carried out, the user employs an input unit such as an operation panel to switch among the dictionaries of the languages corresponding to the characters that are to undergo recognition. This allows the characters of each language to be recognized. Furthermore, control for switching among the dictionaries is required.

However, the aforesaid method of applying character recognition to languages of a plurality of types while the user employs an input unit such as an operation panel to switch among the dictionaries of the various languages demands considerable labor of the user and slows down processing speed.

Further, if a read manuscript consists of a plurality of pages, character recognition is performed using an autofeeder in order to reduce the labor otherwise required with manual feeding of the pages of the manuscript. If the pages of the manuscript contain a mixture of pages in English and pages in Japanese, the user must enter a command whenever one page of the manuscript is read in. This not only detracts from the advantage of using an autofeeder but also ultimately results in lower processing speed.

SUMMARY OF THE INVENTION

An object of the invention is to provide a document orientation discrimination method and apparatus for subjecting various areas contained in document image data to document orientation discrimination and determining the orientation of the image of the document based upon the orientation of each discriminated area, thereby discriminating the orientation of the document accurately.

Another object of the invention is to discriminate the orientation of each area by discriminating the orientation of characters contained in each area, whereby the orientation of each area is judged accurately.

Another object of the invention is to provide a character recognition apparatus which, by being furnished with a document-orientation discrimination unit according to the invention, is capable of displaying a document image in the correct orientation irrespective of the direction in which the document is read and of improving the precision of character recognition.

A further object of the invention is to provide a character recognition apparatus and method which make possible the character recognition of characters used in each of a plurality of languages and raise the processing speed of character recognition.

According to the present invention, the foregoing objects are attained by providing an apparatus for discriminating document orientation, which comprises separating means for separating entered document image data into a plurality of partial areas, attribute assigning means for determining to which of a plurality of types of attributes provided with degrees of priority in advance each of the plurality of partial areas obtained by the separation processing means corresponds, and assigning the attribute determined to each partial area, discriminating means for discriminating document orientation with regard to each of the plurality of partial areas obtained by the separating means, and deciding means for deciding orientation of the document image data based upon the document orientation of each partial area discriminated by the discriminating means and the degree of priority of the attribute assigned to each partial area.

In a preferred embodiment, the discriminating means extracts a plurality of characters contained in a partial area whose orientation is to be discriminated, subjects each character to character recognition from a plurality of directions and adopts the direction for which degree of recognition is highest as the orientation of this partial area. There are many cases in which the orientation of a character indicates the orientation of the document. Accordingly, detecting the orientation of a character can make it possible to judge the orientation of a document accurately.

In a preferred embodiment, the deciding means is such that if there is agreement among results of discriminating document orientation in a plurality of partial areas having attributes with the highest degrees of priority, this document orientation is decided upon as being the orientation of the document image data. Processing for discriminating document orientation can be brought to an end at the moment orientations agree in a plurality of partial areas having high degrees of priority with respect the decision of document orientation. This improves the efficiency of processing.

In a preferred embodiment, the plurality of attributes include an attribute indicative of a character area in the main body of text, an attribute indicative of a character area in a table, an attribute indicative of a character area in a title, and an attribute indicative of a character area for the purpose of explaining a figure. These character areas may be classified more narrowly and character areas can be selected suitable for use in discrimination of orientation.

In a preferred embodiment, the attribute indicative of a character area in the main body of text is adopted as an attribute having the highest degree of priority. The reason for this is that a character in the main body of text is very likely to have an orientation that matches that of the document.

In a preferred embodiment, the attribute indicative of the character area in a title is adopted as an attribute having the highest degree of priority. The reason for this is that the orientation of a character contained in a character area in a title is very likely to have an orientation that matches that of the document.

According to the present invention, the foregoing objects are attained by providing an apparatus for discriminating document orientation, which comprises extracting means for extracting a plurality of partial areas from entered document image data, discriminating means for discriminating orientation with regard to the partial areas extracted by the extracting means, deciding means which, in a case where the discriminated orientations agree in a plurality of partial areas whose orientations have been discriminated by the discriminating means to a predetermined degree of reliability or higher, is for deciding upon this orientation as the orientation of the document image data.

In a preferred embodiment, the extracting means extracts a character area as a partial area, the discriminating means subjects characters contained in the extracted character area to recognition processing from a plurality of directions and adopts the direction for which degree of recognition is highest as the orientation of this character area, and the orientation for which the maximum value of the degree of recognition obtained in the discriminating means exceeds a predetermined value is adopted as that having a reliability greater than the predetermined value.

According to the present invention, the foregoing objects are attained by providing an apparatus for discriminating document orientation, which comprises extracting means for extracting a plurality of partial areas from entered document image data, discriminating means for discriminating document orientation with regard to each of the plurality of partial areas extracted by the extracting means, and deciding means for counting number of times discrimination has been performed by the discriminating means with regard to each document orientation, and deciding upon a document orientation, for which the value of the count is maximum, as being the orientation of the document image data.

In a preferred embodiment, the extracting means extracts a plurality of character areas and, with regard to each of the extracted character areas, the discriminating means subjects characters, which are contained in the character area, to recognition processing from a plurality of directions and adopts the direction for which degree of recognition is highest as the orientation of this character area.

According to the present invention, the foregoing objects are attained by providing a character recognition apparatus comprising separating means for separating entered document image data into a plurality of partial areas, attribute applying means for determining, with regard to each of the plurality of partial areas obtained by the separating means, whether the area corresponds to any attributes of a plurality of types to which degrees of priority have been assigned in advance, and applying the attributes determined to respective ones of the partial areas, discriminating means for discriminating document orientation with regard to each of the plurality of partial areas obtained by the separating means, deciding means for deciding orientation of the document image data based upon the degree of priority of the attribute applied to each partial area, rotating means for rotating the document image data based upon the orientation decided by the deciding means, and recognition means for performing character recognition processing using the document image data rotated by the rotating means.

Thus, the entered document image data are rotated in the correct direction. When a display of document image data is presented, therefore, the document image can be displayed in the correct orientation, regardless of the direction in which the document image data are entered, and it is possible to perform character recognition correctly.

According to the present invention, the foregoing objects are attained by providing a character recognition apparatus for performing character recognition of image data obtained by reading a manuscript, comprising a plurality of recognition means for recognizing characters used in each of a plurality of languages, execution means for executing recognition of the image data by the plurality of recognition means, acquisition means for acquiring recognition rate of each result of recognition obtained by recognition performed by the recognition means, selecting means for selecting any one of a plurality of results of recognition based upon the plurality of recognition rates acquired by the acquisition means, and output means for outputting the result of recognition selected by the selecting means.

In a preferred embodiment, the selecting means has comparison means for comparing the recognition rates of the plurality of results of recognition and selects, on the basis of the results of comparison by the comparison means, the result of recognition having the highest recognition rate. By thus selecting the result of recognition having the highest recognition rate, highly precise character recognition can be carried out.

In a preferred embodiment, the selecting means has comparison means for comparing the recognition rates of the plurality of results of recognition with a predetermined threshold value and selects, on the basis of the results of comparison by the comparison means, the result of recognition having that exceeds the predetermined threshold value.

In a preferred embodiment, the character recognition apparatus further comprises reading means for optically reading the manuscript, and separating means for separating the image data into areas according to attribute on the basis of attributes of the image data read by the reading means.

In a preferred embodiment, the recognition means recognizes an area separated by the separating means the attribute whereof is that of a character as being image data.

In a preferred embodiment, the apparatus further comprises partitioning means for partitioning this area into predetermined units.

In a preferred embodiment, the predetermined units include at least lines and characters.

According to the present invention, the foregoing objects are attained by providing a character recognition apparatus for performing character recognition of image data obtained by reading a manuscript, comprising a plurality of recognition means for recognizing characters used in each of a plurality of languages, execution means for selecting one of the plurality of recognition means and executing recognition of the image data by the selected recognition means, acquisition means for acquiring recognition rate of the result of recognition obtained by recognition performed by the recognition means, comparison means for comparing the recognition rate of the results of recognition acquired by the acquisition means with a predetermined threshold value, output means which, when the results of comparison by the comparison means indicates that the recognition rate is greater than the predetermined threshold value, outputs the result of recognition, and control means for performing control in such a manner that execution by said execution means if performed while successively changing over said recognition means until results are outputted by said output means.

In a preferred embodiment, the apparatus further comprises setting means for setting order in which the recognition means are used, with the changeover being performed in accordance with the order set by the setting means. Processing speed can be raised by changing over the order in dependence upon the application desired by the user.

In a preferred embodiment, the character recognition apparatus further comprises reading means for optically reading the manuscript, and separating means for separating the image data into areas according to attribute on the basis of attributes of the image data read by the reading means.

In a preferred embodiment, the recognition means recognizes an area separated by the separating means the attribute whereof is that of a character as being image data.

In a preferred embodiment, the apparatus further comprises partitioning means for partitioning this area into predetermined units.

In a preferred embodiment, the predetermined units include at least lines and characters.

According to the present invention, the foregoing objects are attained by providing a character recognition method for performing character recognition of image data obtained by reading a manuscript, comprising a plurality of recognition steps of recognizing characters used in each of a plurality of languages, an execution step of executing recognition of the image data at the plurality of recognition steps, an acquisition step of acquiring recognition rate of each result of recognition obtained by recognition performed at the recognition step, a selecting step of selecting any one of a plurality of results of recognition based upon the plurality of recognition rates acquired at the acquisition step, and an output step of outputting the result of recognition selected at the selecting step.

According to the present invention, the foregoing objects are attained by providing a character recognition method for performing character recognition of image data obtained by reading a manuscript, comprising a plurality of recognition steps of recognizing characters used in each of a plurality of languages, an execution step of selecting one of the plurality of recognition steps and executing recognition of the image data by the selected recognition step, an acquisition step of acquiring recognition rate of the result of recognition obtained by recognition performed at the recognition step, a comparison step of comparing the recognition rate of the results of recognition acquired at the acquisition step with a predetermined threshold value, an output step which, when the results of comparison at the comparison step indicates that the recognition rate is greater than the predetermined threshold value, outputs the result of recognition, and a control step of performing control in such a manner that execution of the execution step is performed while successively changing over selection of the recognition step until results are outputted at the output step.

In accordance with the present invention as described above, document orientation is discriminated with regard to a plurality of areas contained in document image data and it is possible to determine the orientation of the document image based upon the orientation of each area discriminated. Document orientation can thus be judged more accurately.

Further, in accordance with the present invention, the orientation of each partial area is discriminated by discriminating the orientation of the characters contained in each area. This makes it possible to judge the orientation of each area more accurately.

Further, in accordance with the present invention, a document image is displayed in the correct orientation irrespective of the direction in which the document is read. The accuracy of character recognition is improved as a result.

In accordance with another aspect of the invention, it is possible to recognize the characters used in a plurality of languages and to raise the processing speed of character recognition.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 7, consisting of FIGS. 7A through C, is a diagram for describing data finally acquired at the end of character recognition;

FIG. 18, consisting of FIGS. 18A and B, is a diagram illustrating the data structure and data blocks created by the area separation processing of the fourth embodiment;

FIGS. 32A, B are diagrams illustrating the structure of the memory map of a storage medium storing program codes for implementing the second embodiment of the invention;

FIGS. 33A, B are diagrams illustrating the structure of the memory map of a storage medium storing program codes for implementing the third embodiment of the invention;

DESCRIPTION OF THE PREFERRED EMBODIMENTS

Figure 1:
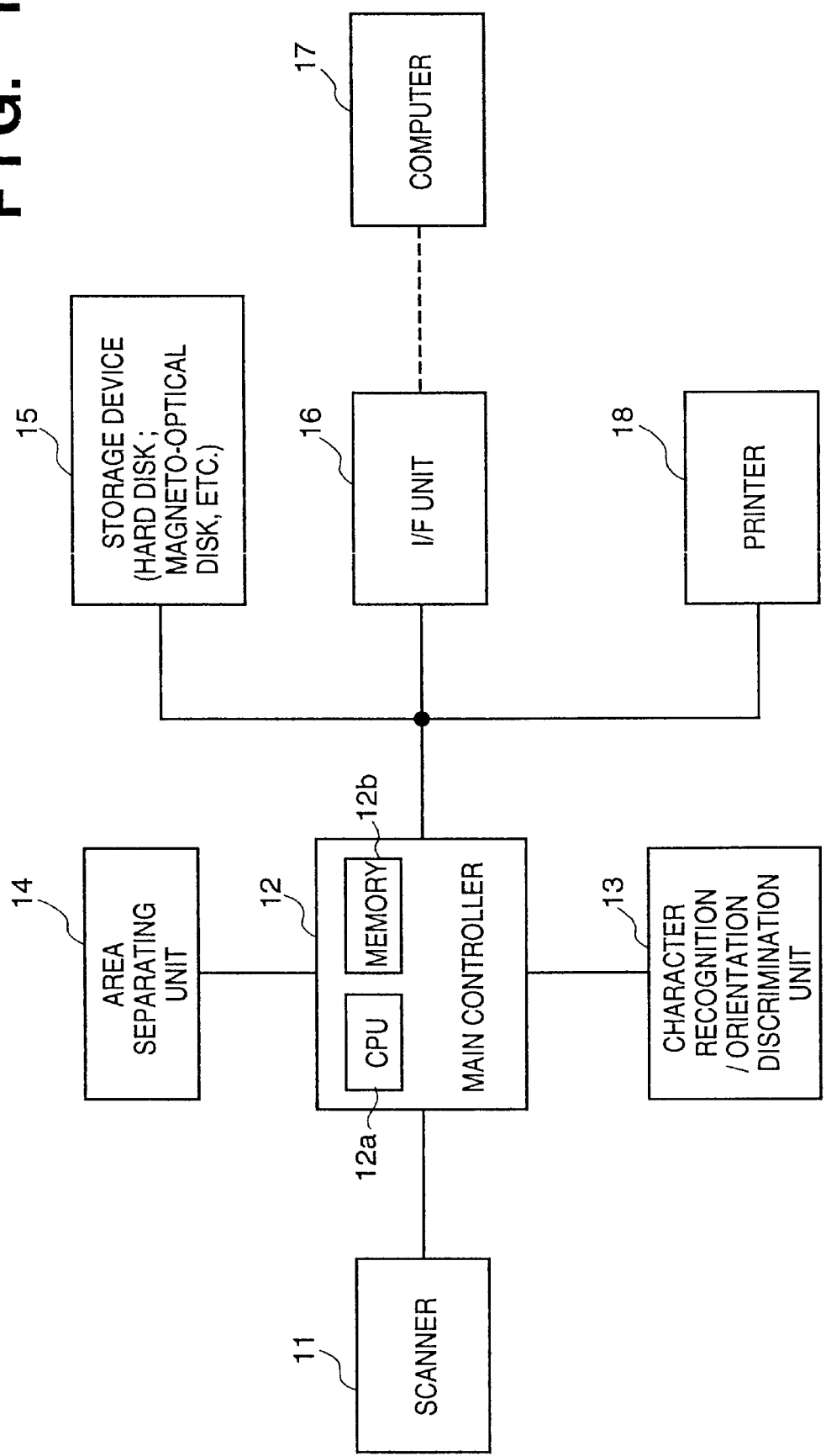
FIG. 1 is a block diagram illustrating the architecture of an information processing system according to a first embodiment of the invention.

Preferred embodiments of the present invention will now be described in detail in accordance with the accompanying drawings.

<First Embodiment>

The character recognition apparatus according to the first embodiment of the invention discriminates the orientation of a document using the recognition rate of character recognition as the character orientation discriminating technique. This method focuses on the fact that a character area expresses the orientation of a document most accurately. A plurality of characters in a character area contained in the document are subjected to character recognition from directions of 0°, 90°, 180° and 270°, and the direction which gives the highest degree of resemblance is judged to be the correct orientation of the document.

According to this character recognition processing, first images are cut one character at a time from an image using a character segmentation method. Next, characters whose features closely resemble the features of characters calculated character by character are selected. The degree of resemblance (degree of confidence) of character recognition is a ratio indicating how close the feature of a character is to a particular feature. Stated in more technical terms, it indicates nearness of distance in a character feature distribution. In case of character recognition, similar characters of a plurality of types are calculated and adopted as candidate characters. Among these candidate characters, the one having the shortest distance is adopted as the first candidate character.

When the above-described recognition processing is performed in four directions, character recognition is carried out in all four directions but the distance values (degrees of confidence) of the candidate characters differ. Naturally a character oriented in the correct direction will have a small distance value. However, the fact that the distance value is small does not necessarily indicate an accurate determination. There are instances where the angle of an incorrect direction happens to give a good value in character recognition performed from an angle other than that of the correct direction.

Accordingly, a plurality of characters, e.g., ten, are extracted and the orientations thereof are discriminated, the nearness distances thereof are calculated and the mean value of these is adopted as a reference criterion. To improve precision, blocks of characters are selected and subjected to the same processing. The orientation of the document is discriminated utilizing the recognition rate of character recognition as described above. In the embodiment set forth below, the following processing is executed before orientation is discriminated using the precision of character recognition:

The document image data initially are subjected to area partitioning processing. An area judged to be a character area as the result of this area partitioning processing is subjected to orientation discrimination processing utilizing character recognition processing. Since the character area used in this determination is obtained on the basis of results obtained by area partitioning processing, the attribute thereof is obtained in greater detail. For example, a character area is discriminated as being a text area, a title area, a caption area or a character area in a table. The method of this embodiment is characterized by setting an order of priority with regard to these attributes and giving precedence to use of the document orientation discriminated in the area having the highest priority. For example, the following order of priority may be considered as one example:

(1) Priority to titles: In a document image, a title has characters of large size, the characters are easy to recognize and the possibility that the orientation of the title will coincide with the correct orientation of the document is high. Accordingly, the order of priority of a title area is set to be high.

(2) Priority to text: In a document image, a text area representing the main body of text is the most prevalent in the document. Often the size of this area is a certain fixed size and the characters in the area are easy to recognize. For this reason the order of priority of a text area is set to be high.

(3) Low priority to characters in tables: In a case where a table exists in a document image and characters exist in the table, the possibility that a character will have an orientation different from the primary orientation of the manuscript is high. For this reason the order of priority of a character area in a table is set to be low.

(4) Low priority to caption characters: If a document image contains a figure or table, explanatory characters are often present above, below or at the side of the figure or table. An area in which such characters are present is referred to as a caption area. In a caption area at the side of a figure or table, the possibility that the characters in this area will have an orientation different from primary orientation of the manuscript is high. For this reason the order of priority of a caption area in a table is set to be low.

Thus, the attributes of character areas are provided with an order of priority and discrimination of document orientation is performed using the characters in a character area having a high order of priority. Results of character recognition and correct-orientation image data are obtained upon rotating the original image to the correct orientation in accordance with the results of discrimination. The details will be described with regard to the first embodiment of the invention.

FIG. 1 is a block diagram illustrating the architecture of an information processing system according to a first embodiment of the present invention. The information processing system is an image input/output system having an image input section, an image processing section, an output section and an external I/F. A scanner/printer comprising a separate scanner and printer or an integrated copier conforms to such a system. This system is capable of being connected to a computer via the I/F and can perform various operations in response to commands from the computer side.

A scanner 11 acquires image data by optically reading a document. The scanner 11 is capable of being fitted with an autofeeder. Mounting the autofeeder makes it possible to continuously enter a plurality of documents. A main controller 12 has a CPU 12a and a memory 12b (constituted by a ROM and RAM). By using the results of processing executed by a character recognition/orientation discrimination unit 13 and an area separating unit 14, the main controller 12 subjects the system to various types of control and temporarily saves image data.

The recognition/orientation discrimination unit 13, which is a characterizing feature of this embodiment, executes processing to discriminate document orientation and performs character recognition. The area separating unit 14 executes processing for separating document image data into rectangular areas such as character areas, graphic areas, natural-picture areas and table areas and adding on the attribute of each area.

A storage device 15 saves a variety of processed results (image data, results of area separation, results of character recognition, etc.) and is constituted by a hard disk, a magneto-optical disk, etc. An I/F 16 is for sending data to an external device and is an SCSI or RS232C interface in regard to the form of data transmission. A computer 17 obtains information via the I/F 16, obtains data from the storage device 15 and utilizes the information and data. For example, a configuration can be adopted in which a DTP (desktop publishing) application is run by the computer 17, document data obtained by character recognition processing is acquired from the storage device 15 and the document image data are used as data to undergo editing. A printer 18 outputs data that have been operated on in accordance with the area separation information and character recognition information.

Figure 2:
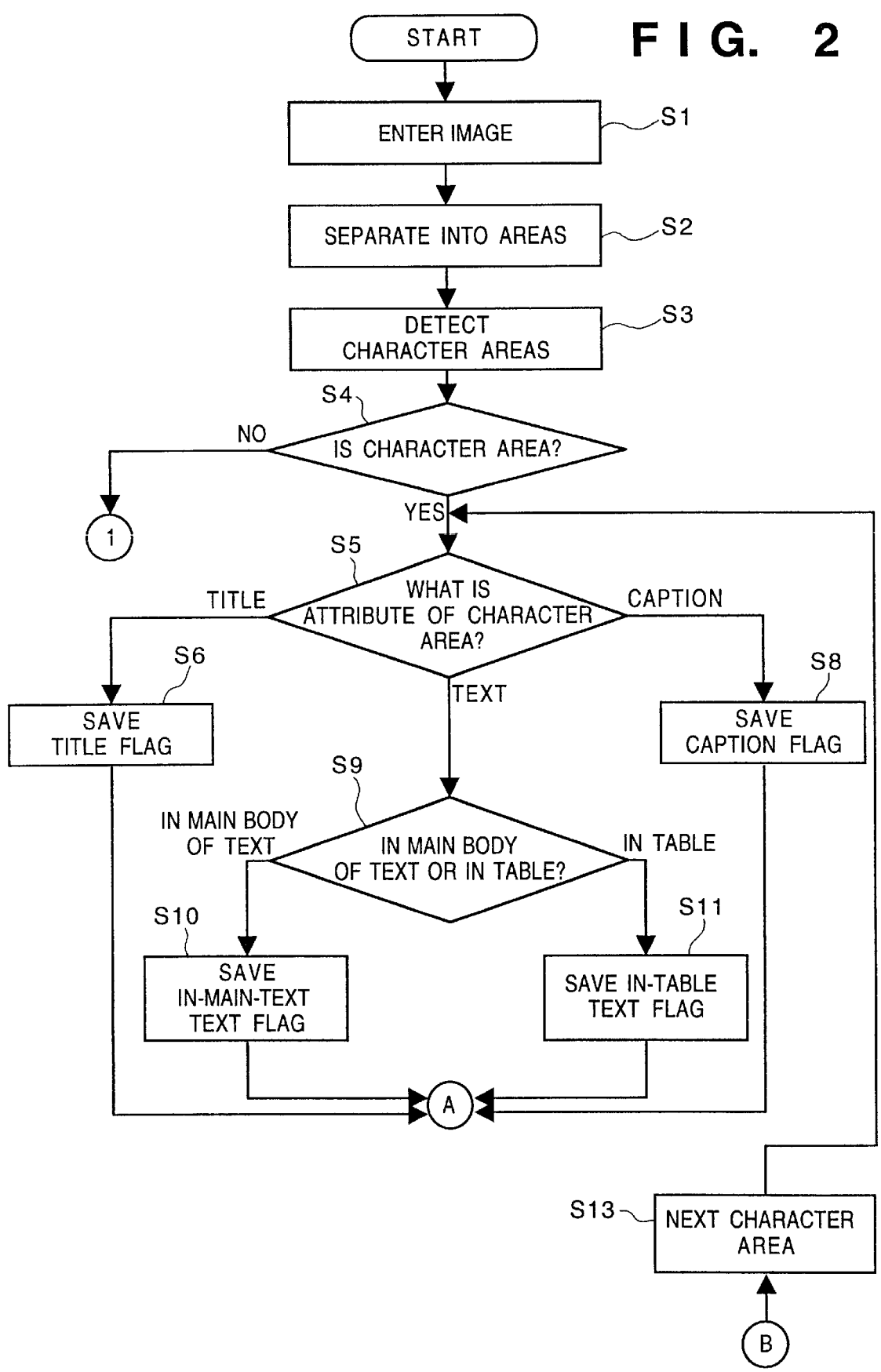
FIG. 2 is a flowchart illustrating the procedure of character recognition according to the first embodiment.

The operation of this embodiment will be described with reference to FIGS. 2 through 4, which are flowcharts illustrating the procedure of character recognition processing according to this embodiment. The control program for implementing the procedure indicated by these flowcharts is stored in the ROM of memory 12b and is executed by the CPU 12a.

A manuscript is read in by the scanner 11 and document image data area obtained at step S1. The document image data obtained are stored in the RAM of memory 12b. Next, the document image data are subjected to area separation processing at step S2. Area separation processing is executed by entering the document image data, which have been stored in the memory 12b, into the area separating unit 14. The details of this processing will be described later. The results of separation include rectangle information, namely information representing rectangles that enclose respective areas, and attribute information relating to each area. The results of separation, which are stored in a main memory (the RAM of memory 12b), are for being accessed frequently by the CPU 12a in subsequent processing.

Among the areas separated from the document image data by area separation processing, areas whose attributes are judged to be indicative of character areas (text areas, title areas, table text areas and figure caption areas) are extracted at step S3. These extracted areas undergo orientation discrimination processing at the ensuing steps S4 through S16.

It is determined at step S4 whether the aforementioned manuscript contains an area discriminated as being a character area. If the manuscript does not contain a character area, the program proceeds to step S21. Here it is judged that discrimination of orientation is impossible and the orientation in which the manuscript was read is adopted as being the correct orientation (orientation 0°).

If the manuscript is found to contain a character area at step S4, then the program proceeds to step S5. Here one area judged as being a character area is extracted and processing branches depending upon the attribute of this area. Specifically, the program branches to step S6 if the attribute of the extracted character area is that of a title area, to step S9 if the attribute of the extracted character area is that of a text area and to step S8 if the attribute of the extracted character area is that of a caption area.

At step S6 the area is understood as being a title area and a TITLE flag indicative of this fact is stored in memory. At step S8 the area is understood as being a caption area and a CAPTION flag indicative of this fact is stored in memory.

If the area is a text area, the program proceeds to step S9, where it is determined whether the text area is that in the main body text or that in a table. If the area is a text area in the main body of text, the program proceeds to step S10. If the area is a text area in a table, the program proceeds to step S11. At step S10 an in-main-text TEXT flag, which indicates that the character area is a text area in the main body of text, is stored in memory. At step S11 an in-table TEXT flag, which indicates that the character area is a text area in a table, is stored in memory.

Character recognition based upon reading the manuscript from a plurality of angles is performed at step S12 and document orientation is performed in the aforesaid area based upon the results of character recognition. The details of document orientation discrimination will be described later. If document orientation in the aforesaid area could be discriminated at step S12, the program proceeds to step S14. If discrimination of document orientation is found to be impossible at step S12, the program proceeds to step S16.

At step S14 the results of orientation discrimination performed at step S12 are stored according to flag (i.e., TITLE, CAPTION, TEXT in table, TEXT in main body of text). This is followed by step S15, at which it is determined whether results of discriminating orientation agree in a plurality of character areas judged to be TEXT in main body of text. If agreement could be detected, then this orientation is taken as being the result of discriminating orientation and the program proceeds to step S22. If agreement could not be detected, then the program proceeds to step S16. Here it is determined whether all character areas were subjected to the processing of steps S5 through S15. If there is a character area that has not yet been processed, then the program proceeds to step S13, at which the next character area is adopted as the object of processing, and then returns from step S13 to step S5.

If matching orientations cannot be detected in character areas judged to be text areas in the main body of text and the processing of steps S5~S15 has been applied to all of the character areas extracted at step S3, then the program proceeds from step S16 to step S17. Here it is determined whether results of discriminating orientation agree in a plurality of character areas discriminated as being title areas. If matching orientations can be detected, then this orientation is adopted as being the result of discriminating orientation and the program proceeds to step S22.

If matching orientations cannot be detected at step S17, on the other hand, then the program proceeds to step S18. Here it is determined whether results of discriminating orientation at a plurality of locations agree in a character area discriminated as being a text area in a table. If matching orientations can be detected, then this orientation is adopted as being the result of discriminating orientation and the program proceeds to step S22.

If matching orientations cannot be detected at step S18, then the program proceeds to step S19. Here it is determined whether results of discriminating orientation at a plurality of locations agree in a character area discriminated as being a caption area. If matching orientations can be detected, then this orientation is adopted as being the result of discriminating orientation and the program proceeds to step S22.

If matching orientations cannot be detected at step S19, then the program proceeds to step S20. Here it is determined whether an area for which results of orientation discrimination have been obtained exists among the character areas that have been extracted. If even one area for which results of orientation discrimination have been obtained can be found, then the orientation of this area is adopted as the result of discriminating orientation and the program proceeds to step S22. It should be noted that the check made at step S20 is performed in the following order: text area in main body of text, title area, text area in table and caption area.

If a character area for which results of discriminating orientation have been obtained is found not to exist at step S20, then the program proceeds to step S21, where it is judged that discrimination of orientation is impossible. In such case the orientation in which the manuscript was read by the scanner 11 is adopted as being the document orientation (i.e., as an image of 0°) and the program proceeds to step S26, where processing continues.

In a case where orientation discrimination results of some kind have been obtained, then these results are acquired at step S22 and it is determined at step S23 whether the results are indicative of 0°. If the results are indicative of 0°, the image is not rotated and the program proceeds to step S26.

The image data that have been stored in memory 12b are rotated in accordance with the results (any one of 90°, 180°, 270° in this embodiment) of discriminating orientation at step S24. This is followed by step S25, at which the image data that have been stored in member 12b are again subjected to area separation processing similar to that of step S2. The results of area separation are stored in the main memory (RAM) in the same manner as at step S2.

This is followed by step S26, at which character recognition is applied, over all character areas, to image data that have been corrected to the proper orientation or to image data that have been read in at the correct orientation from the start. Next, at step S27, the results of character recognition are obtained and stored in the storage device 15.

In accordance with the first embodiment, as described above, document orientation is discriminated using character areas contained in the document. The priority of a document text area judged to be an area in which the characters are oriented in the most proper direction in the document is set high and used in discriminating orientation. This improves the reliability of the results of discriminating orientation.

If document orientation is judged to be the correct orientation, then character recognition processing is applied to character blocks in the image. If an image is entered in the improper direction, then the image data are rotated to the correct orientation, the obtained rotated image is subjected to area separation correction processing again and character recognition is carried out.

The image data obtained by rotation processing are subjected to area separation again in order to correct for disparities in the area separation information that accompany image rotation. The method of subjecting the rotated image to area separation is (A) a method in which all image data after rotation are subjected to area separation processing again, or (B) a method in which an address conversion is applied to results of area separation. Since area separation processing generally is premised on the image being in the correct orientation, often the results of area separation processing executed at an initial stage and the results of area separation processing applied to image data that have been rotated differ. Accordingly, method (A) generally is adopted.

Each character area in the rotated image data is subjected to character recognition by the character recognition processing system (namely the character recognition/orientation discrimination unit 13). As a result, area separation information and character recognition information is finally obtained regardless of whether an image is one that does or does not require rotation processing. Furthermore, the results of processing are capable of being transferred to the computer 17 via the I/F 16 in FIG. 1, and the results may be utilized in the application software (e.g., software for filing processing or document processing) run on the computer 17.

It goes without saying that the results of processing may be transferred to and stored in the storage device 15. The form of processing for thus making a transfer to the storage device 15 is utilized in a scheme employed in batch-processing fashion, namely a scheme in which image data are entered continuously from the scanner 11, the results of processing are stored in the storage device 15 and then the information is read out collectively by the computer 17.

In processing for transferring the results of processing to the printer 18, a document is rearranged or produced as a clean copy by reverse PDL (a method of creating page description language from image data) or HTML (a method of describing layout or document structure) using character recognition and area separation, on the assumption that the printer is equipped with a function for interpreting page description language.

A technique for discriminating the orientation of a document using character recognition processing will now be described.

[Area separation processing]

Black pixels of document image data are detected and a rectangular frame for a block of black pixels is created by outline tracing or labeling. Next, the density of black pixels in the rectangle, or whether their is a neighboring rectangular block, or the length-to-width ratio of the rectangle is adopted as a criterion to judge whether each rectangle is a character area (a title, main body of text, caption, etc.), a graphic area, a natural-picture area or a table area, etc. Rectangle information indicative of the character recognition is discriminated on the basis of the results of this processing.

[Character recognition processing]

One method of performing character recognition processing is to extract and compare feature vectors.

FIG. 5 is a diagram for describing the technique of character recognition processing used in the first embodiment. FIG. 5A illustrates a document image to undergo processing. An area 51 which includes the text "1. HOME PAGE" has been extracted as a character area. The first stage of character recognition processing is to execute processing for segmenting individual characters (shown as alphabet but may be applied to characters of any other languages), as illustrated in FIG. 5B. This is processing for cutting out the rectangle of one character and involves detecting continuity of black pixels.

Figure 5A:
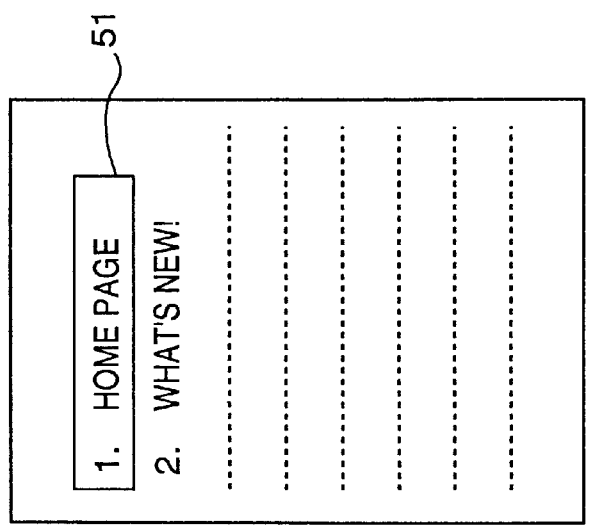
FIG. 5, consisting of FIGS. 5A through D, is a diagram for describing the technique of character recognition processing used in the first embodiment.
Figure 5B:
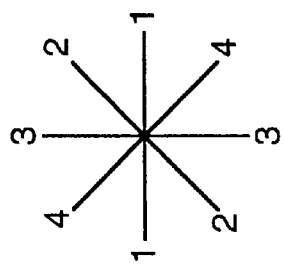
Figure 5C:
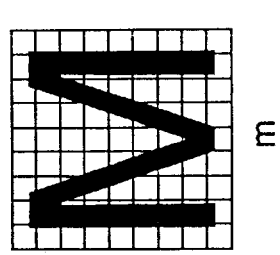
Figure 5D:
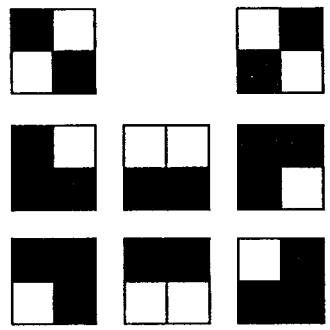

The second stage is to partition the rectangle of one character into m×n blocks (e.g., 64×64 blocks), as illustrated in FIG. 5C. A black-pixel distribution direction (direction vector information) is extracted from these blocks using a window of size 2×2 pixels. FIG. 5D shows examples of direction vector information. The window is successively shifted to obtain several dozen items of direction vector information. This vector information forms the feature of the character.

The feature vector is compared with a character recognition dictionary in which standard feature vectors have been registered beforehand with regard to each of the characters. Characters are extracted in regular order starting from the character for which the two compared feature vectors most closely resemble each other. This character giving the closest resemblance serves as a first candidate, the character giving the next closest resemblance serves as a second candidate, the character giving the next closest resemblance serves as a third candidate, and so on. The resemblance of these two feature vectors is a numerical value, namely the closeness of distance to the character or the aforementioned degree of confidence.

[Character orientation discrimination processing]

Figures 6A, 6B, 6C:
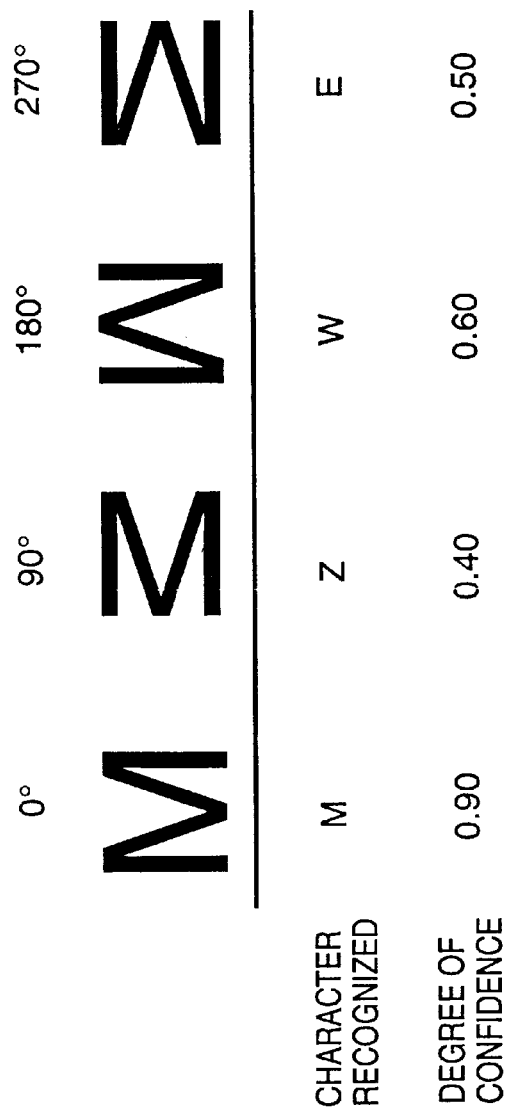
FIG. 6, consisting of FIGS. 6A through C, is a diagram for describing a method of detecting document orientation according to the first embodiment.

The degree of confidence of a character is obtained by the character recognition processing described above. A procedure for detecting document orientation using this character recognition processing will be described with reference to FIG. 6. FIG. 6 is a diagram for describing a method of detecting document orientation according to the first embodiment. FIG. 6A illustrates characters "HOME" in the correct orientation and FIG. 6B the same characters "HOME" upon being rotated by 270°. Here character recognition will be tried from orientations of 0°, 90°, 180° and 270° taking the character "M" as an example, as illustrated in FIG. 6C. Recognition processing based upon these angles can be implemented by changing the direction in which the image data are read from the area of the character rectangle; no rotation of the original image data is particularly required. Observing the results (c) of character recognition based upon each angle indicates that the recognized character differs according to the angle. It should be noted that the results of recognition shown in FIG. 6C are provisional results of character recognition and degree of confidence for explanatory purposes.

In accordance with the results of recognition based upon the correctly oriented character in FIG. 6C, "M" is recognized and the degree of confidence has a high value of 0.90. If the character is rotated 90°, "Z" is recognized and the degree of confidence falls to 0.40. The reason for this is that a character having a similar feature has been forcibly extracted from the feature of a character that is improperly oriented. Similarly, degrees of confidence obtained at 180° and 270° of rotation also have low values. The more complicated the character, the greater the difference in degree of confidence after rotation.

In accordance with the results of FIG. 6C, it is judged that the likelihood that the document is correctly oriented is high. In order to improve accuracy, the same processing is applied to several characters. Since there is the possibility that a single character block may represent a special case, it is required that processing be tried with regard to different character areas.

Orientation can be discriminated because the value of an orientation that has undergone rotation will be higher than the mean value of the degrees of confidence obtained from each of the angles. Since there is a difference in degree of confidence between 0° and 180° and between 90° and 270°, four orientations can be ascertained. As a result, more accurate results of orientation discrimination are obtained.

Next, if it has been judged that rotation is required, the original image is rotated. The details of this need not be described here as such rotation can be achieved by a well-known technique using the CPU 12a and memory 12b of the main controller 12.

[Information finally acquired]

FIG. 7 is a diagram for describing data finally acquired at the end of character recognition. Original image data (A), area separation data (B) and results of OCR (results of character recognition) (C) can be obtained with regard to an image for which the document orientation has eventually been corrected by the processing described above.

The original image data (A) are rotated image data for which the reading direction has been corrected to the correct direction. In the area separation data (B), "header" indicates that the data which follow it are area separation data. Specifically, "rect1"~"rectn" are area separation data regarding respective ones of areas that have been detected. Each of "rect1"~"rectn" has a structure of the kind indicated at 71. That is, each of "rect1"~"rectn" is composed of data representing "order", which indicates a number for specifying the area, "att", which indicates the attribute of the area, "x1,y1", which indicates the position of the rectangle (the corner at the upper left of the rectangle), "w,h", which represents the width and height of the area, and "direction", which represents the typesetting direction (vertical writing or horizontal writing) of the area.

The character recognition information is of the form illustrated at (C). The data "OCR1"~"OCRn" are results of character recognition applied to the areas "rect1"~"rectn", respectively. The results of character recognition each have a data structure of the kind indicated at 73. Further, "blk header" is a header added on before the results of character recognition of each area and inserts information as to the type of rectangular area that was subjected to character recognition processing. The header "blk header" has a "type", an "order", an "att", an "x1", "y1", "w", "h" and a "direction". The data "order"~"direction" are similar to the identically named data in the above-mentioned area separation data 71. The "type" indicates that the data to follow is the blk header. Further, a language distinction, such as the Japanese language, English language or some other language also is indicated with regard to the result of character recognition.

The "type" in the results 73 of character recognition is the same as the "type" in the blk header except for the fact that it indicates that the data to follow are the results of character recognition. Further, "character 1", etc., is a character code serving as the result of recognition. Furthermore, "x1", "y1", "w", "h", in the results 73 of character recognition are character rectangle information when a character is cut from an input image. In addition, "reserve" indicates reserved field. The above-mentioned information is used by an application, e.g., an application for electronic filing, document shaping, DTP, etc.

In the first embodiment described above, the attribute of a character area contained in a document is adopted as an item in order of priority. Text in the main body of text is given the highest priority but the setting of this priority is limited to that described here. For example, the priority of a title area may be set to be the highest on the grounds that a title area has a high probability of being correctly oriented.

Figure 3:
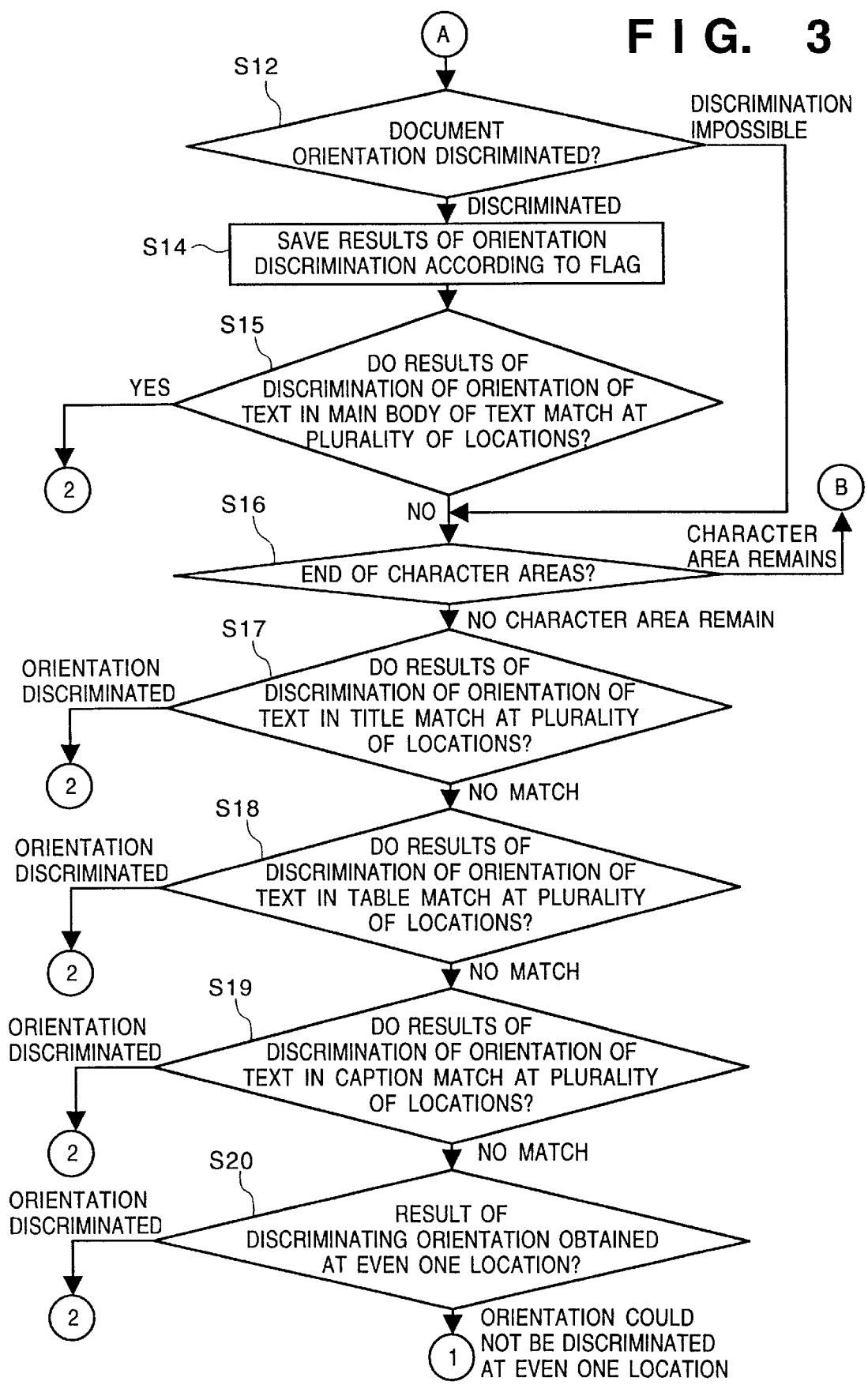
FIG. 3 is a flowchart illustrating the procedure of character recognition according to the first embodiment.
Figure 8:
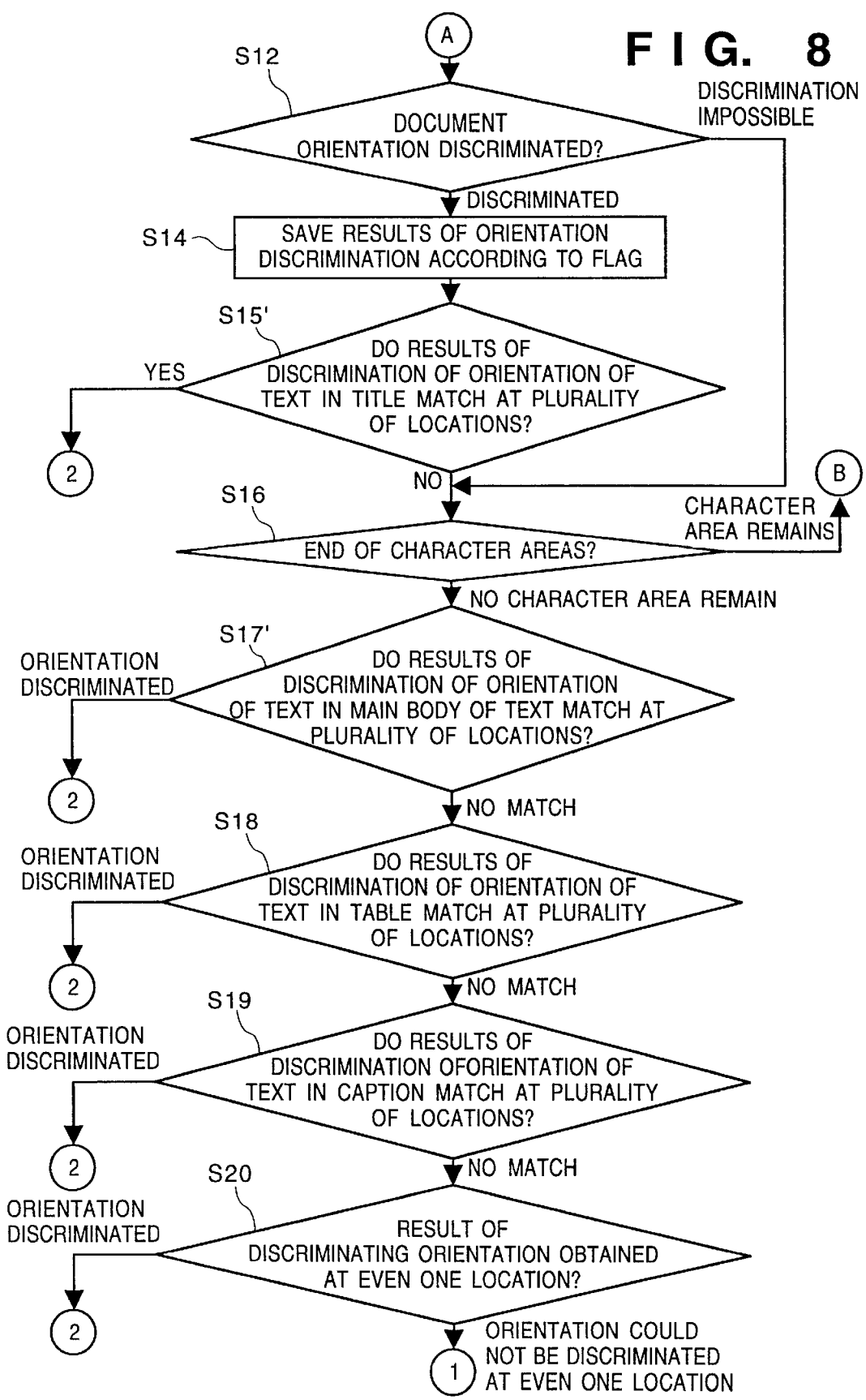
FIG. 8 is a flowchart for describing character recognition processing in a case where a title area is adopted as an area having the highest degree of priority.

In the processing procedure of the first embodiment, order of priority in the discrimination of orientation is decided depending upon which area, with a particular attribute, is being referred to at steps S15, S17~S19 in FIG. 3. The younger the step number at which an area is referred to, the higher the priority. Accordingly, order of priority in discrimination of orientation can be changed by changing the attributes of the areas referred to in these steps. FIG. 8 is a flowchart for describing the procedure of character recognition processing in a case where a title area is adopted as an area having the highest degree of priority. The processing procedure shown in FIG. 8 corresponds to that shown in FIG. 3 and steps at which identical processing is executed are identified by identical step numbers. A comparison of FIG. 8 and FIG. 3 clearly shows that the attributes of the areas referred to at steps S15 and S17 are interchanged to give steps S15' and S17' in FIG. 8, whereby the change in order of priority is achieved.

Conversely, the attribute of a caption area written at the side of a figure or table in a document is given the lowest priority. However, it is obvious that a character area in a table can be adopted as the area having the lowest priority on the grounds that a character area in a table is highly likely to be oriented in an usual direction.

<Second Embodiment>

In the first embodiment described above, an order of priority is assigned to the attributes of character areas and document orientation is judged by giving preference to use of a document orientation judged from a character area having an attribute possessing a high degree of priority. In a second embodiment of the invention, results of judgment exhibiting a high degree of confidence are used in judging the orientation of a character area. If these results of judgment agree with those of a plurality of character areas, then this orientation is decided upon as the orientation of the document.

In accordance with the second embodiment, character image data are subjected to area partitioning processing, and orientation discrimination processing utilizing character recognition processing is applied to an area judged to be a character area as the result of the area partitioning processing. If results of orientation discrimination having a degree of confidence higher than a certain level are obtained in a character area, the results are adopted as a first candidate for results of orientation recognition. Other character areas are then scrutinized for orientation in succession. If results having a degree of confidence in excess of a predetermined threshold value are obtained, then these results are adopted as a second candidate for results of orientation recognition. If the first and second candidates thus obtained agree, then it is judged that this orientation is the orientation of the document.

The architecture of the system used in the second embodiment is the same as that of FIG. 1 in the first embodiment and need not be described again.

Figure 9:
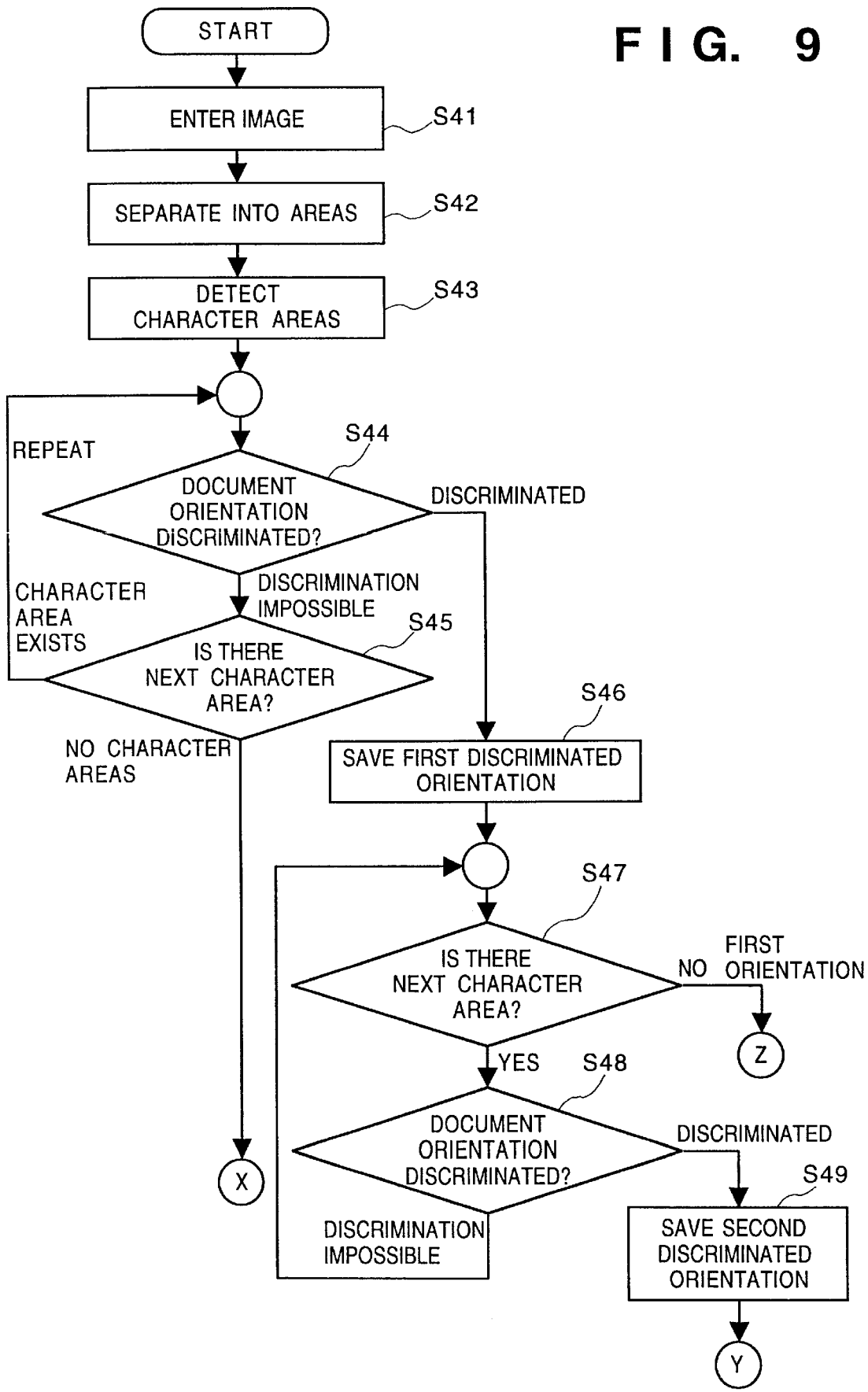
FIG. 9 is a flowchart illustrating the procedure of character recognition processing according to the second embodiment of the invention.
Figure 10:
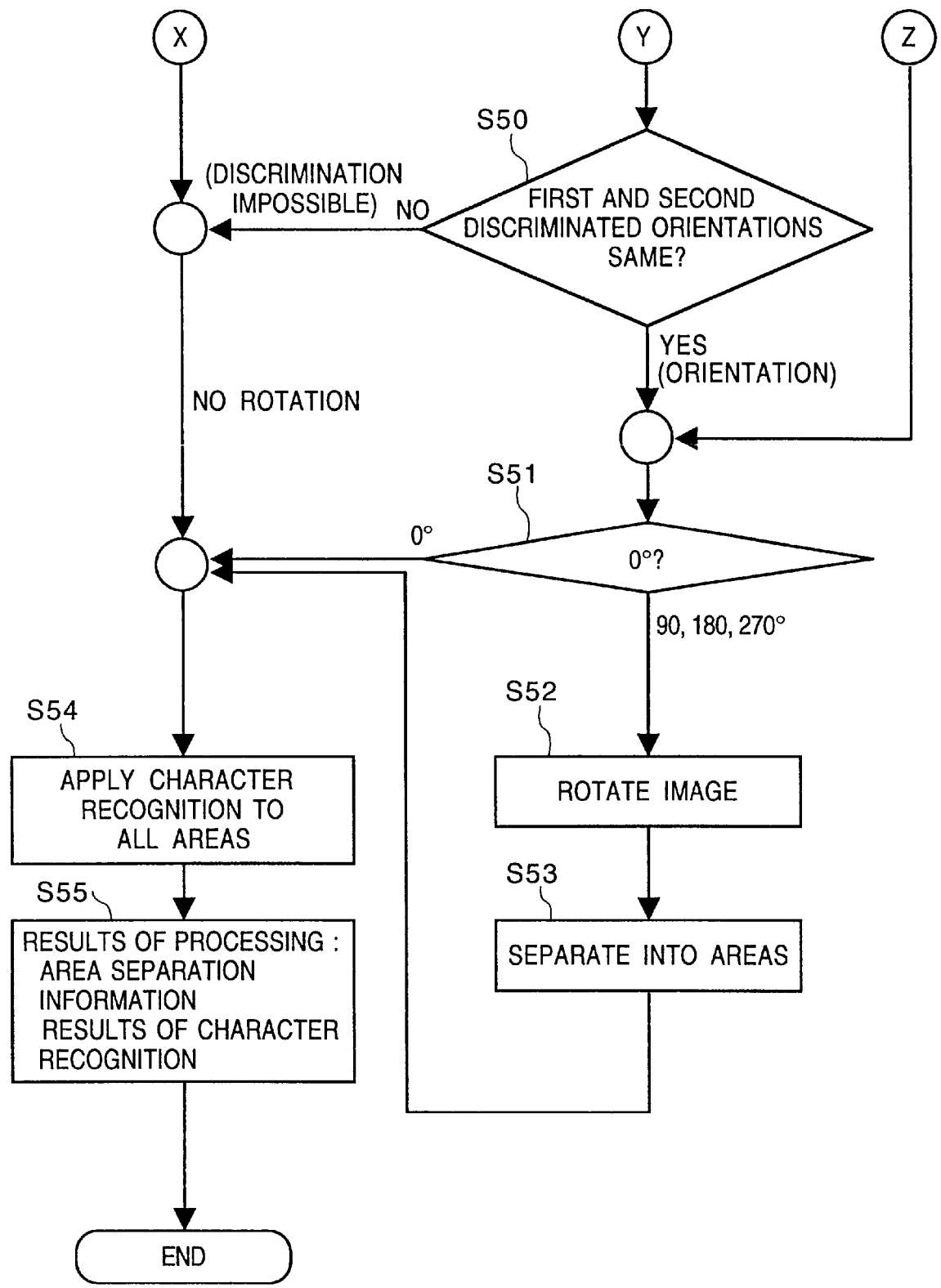
FIG. 10 is a flowchart illustrating the procedure of character recognition processing according to the second embodiment.

FIGS. 9 and 10 are flowcharts illustrating the procedure of character recognition processing according to the second embodiment of the invention.

A manuscript is read in by the scanner 11 and document image data area obtained at step S41. Next, the document image data that have been obtained are subjected to area separation processing at step S42. This processing is the same as that described in the first embodiment. Character areas are extracted from the separated areas at step S43.

One of the character areas extracted is scrutinized for document orientation at step S44. The method of discriminating document orientation is as described in the first embodiment. If the character orientation of the character area cannot be discriminated, then the program proceeds to step S45, where it is determined whether there are any character areas that have not yet been processed. If there is such a character area, then the program returns to step S44. If it is found at step S45 that there are no unprocessed character areas, then the program proceeds to step S54 on the grounds that discriminating direction of rotation is impossible. It should be noted that the determination as to whether document orientation can or cannot be discriminated at step S44 is made based upon whether results of judgment having a predetermined degree of confidence have been obtained. Accordingly, results of judgment exhibiting a low degree of confidence are excluded by adopting a somewhat high value for degree of confidence.

The result of discriminating document orientation at step S44 is saved as a first discriminated orientation at step S46. More specifically, if a result of discriminating document orientation having a degree of confidence greater than a predetermined value has been obtained at steps S44 and S45, then this discriminated orientation is saved as the first discriminated orientation.

This is followed by steps S47~S49, at which processing similar to that of steps S44~S46 is executed. If a result of discriminating document orientation having a degree of confidence greater than the predetermined value has been obtained at steps S47 and S48, then this discriminated orientation is saved as a second discriminated orientation.

When the second discriminated orientation is saved at step S49, it is determined at step S50 whether the first and second discriminated orientations are the same. If they are the same, then the program proceeds to step S51, whence processing branches depending upon the angle of discriminated orientation. If the discriminated orientation is found to be 0° at step S51, then processing such as image rotation is unnecessary and the program proceeds to step S54, at which character recognition processing is executed directly.

If the discriminated orientation is found to be 90°, 180° or 270° at step S51, then the program proceeds to step S52. Here the image is rotated based upon the detected orientation so as to orient the image correctly. This is followed by step S53, at which the rotated image data are subjected to area separation again. The program then proceeds to step S54 so that character recognition may be applied to all characters.

If, prior to detection of the second discriminated orientation, it is found at step S47 that there are no character areas to be processed, then the first discriminated orientation saved at step S46 is employed as the orientation of the document image and the program proceeds directly to step S51.

If it is found at step S50 that the two discriminated orientations do not coincide, the program proceeds to step S54 on the grounds that document orientation cannot be discriminated. (More specifically, all characters are subjected to recognition processing without the image being rotated.)

Character recognition is executed with regard to all character areas of the image at step S54. Area separation information and character recognition information of the kind shown in FIG. 7 are generated at step S55.

In accordance with the second embodiment, as described above, a determination as to whether discrimination of document orientation is based upon whether or not the degree of confidence is greater than a predetermined value. The precision of orientation discrimination is raised by arranging it so that results of discrimination having a low degree of confidence are not employed.

In the second embodiment described above, document areas for which results of orientation discrimination having a degree of confidence greater than a predetermined value are detected at two locations. If these results of discriminating orientation in the two document areas agree, then these results are acquired as the results of orientation discrimination. However, it is possible to adopt an arrangement in which it is judged whether discriminated orientations agree in three or more character areas.

Further, in the second embodiment, document orientation is decided by agreement between initially detected first and second discriminated orientations so that time will not be spent on processing for discriminating orientation of a document for which orientation is indeterminate. However, an arrangement may be adopted in which the program returns to step S44 when the first and second discriminated orientations fail to match at step S50. This allows detection of orientation to be re-tried using another character area. If the orientation detected based upon the other character area matches either the first or second discriminated orientation, it will suffice to decide upon this orientation as the document orientation.

<Third Embodiment>

The third embodiment of the invention is a method of scrutinizing all character areas for orientation and deciding upon document orientation based upon the orientation discriminated a large number of times.

Figure 11:
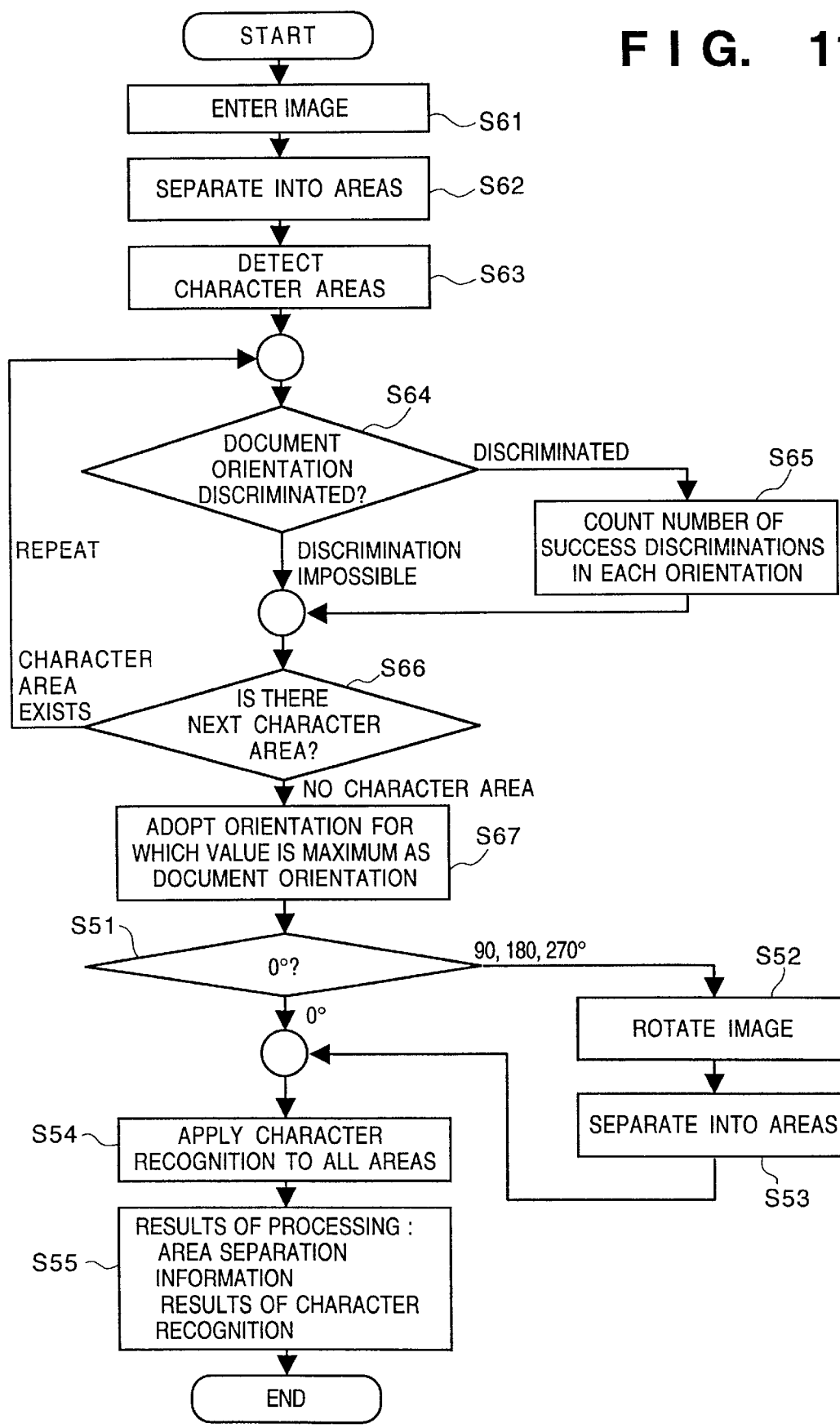
FIG. 11 is a flowchart illustrating the procedure of character recognition processing according to the second embodiment.

FIG. 11 is a flowchart illustrating the procedure of character recognition processing according to the third embodiment.

Steps S61~S63 in FIG. 11 indicate processing the same as that executed at steps S41~S43 in FIG. 9. One of the character areas extracted at step S63 is scrutinized for orientation at step S64. If an orientation having a degree of confidence greater than a predetermined value is discriminated, then the program proceeds to step S65. Here the discrimination count is incremented whenever orientation has been detected at step S64. The count of number of successful discriminations is stored in a predetermined storage area provided in the RAM of memory 12b. The program then proceeds to step S66.

If orientation discrimination having a degree of confidence greater than a predetermined value cannot be performed at step S64, then the program proceeds directly to step S66. Here it is determined whether there are any character areas that have not yet been processed. If there is such a character area, then the program returns to step S64. If it is found at step S66 that there are no unprocessed character areas, then the program proceeds to step S67. Thus, orientation is scrutinized in all character areas and the number of times orientation has been discriminated to have a degree of confidence greater than the predetermined value is counted for each orientation (0°, 90°, 180° and 270° in this embodiment).

The orientation for which the count is highest is detected at step S67 and this orientation is decided upon as the document orientation. The program proceeds to step S51 of the grounds that the orientation thus determined is the result of discrimination processing. It should be noted that steps S51~S55 are the same as the identically numbered steps in FIG. 10 and need not be described again.

In accordance with the third embodiment, as described above, all character areas are scrutinized with regard orientation and the orientation discriminated the largest number of times is adopted as the document orientation. This makes it possible to determine document orientation highly precisely.

In accordance with the first through third embodiments, a plurality of character areas contained in a document are scrutinized to judge the orientation of the document. This makes it possible to obtain results of discrimination that are more accurate. Consequently, even if a document is entered in the wrong orientation, this can be corrected for automatically. The result is a major savings in human labor particularly in a system for filing documents entered in large quantities. Moreover, in character recognition processing as well, character recognition is no longer performed on the basis of erroneous orientation. Misrecognition can be prevented and image data are saved in the correct orientation.

<Fourth Embodiment>

Figure 12:
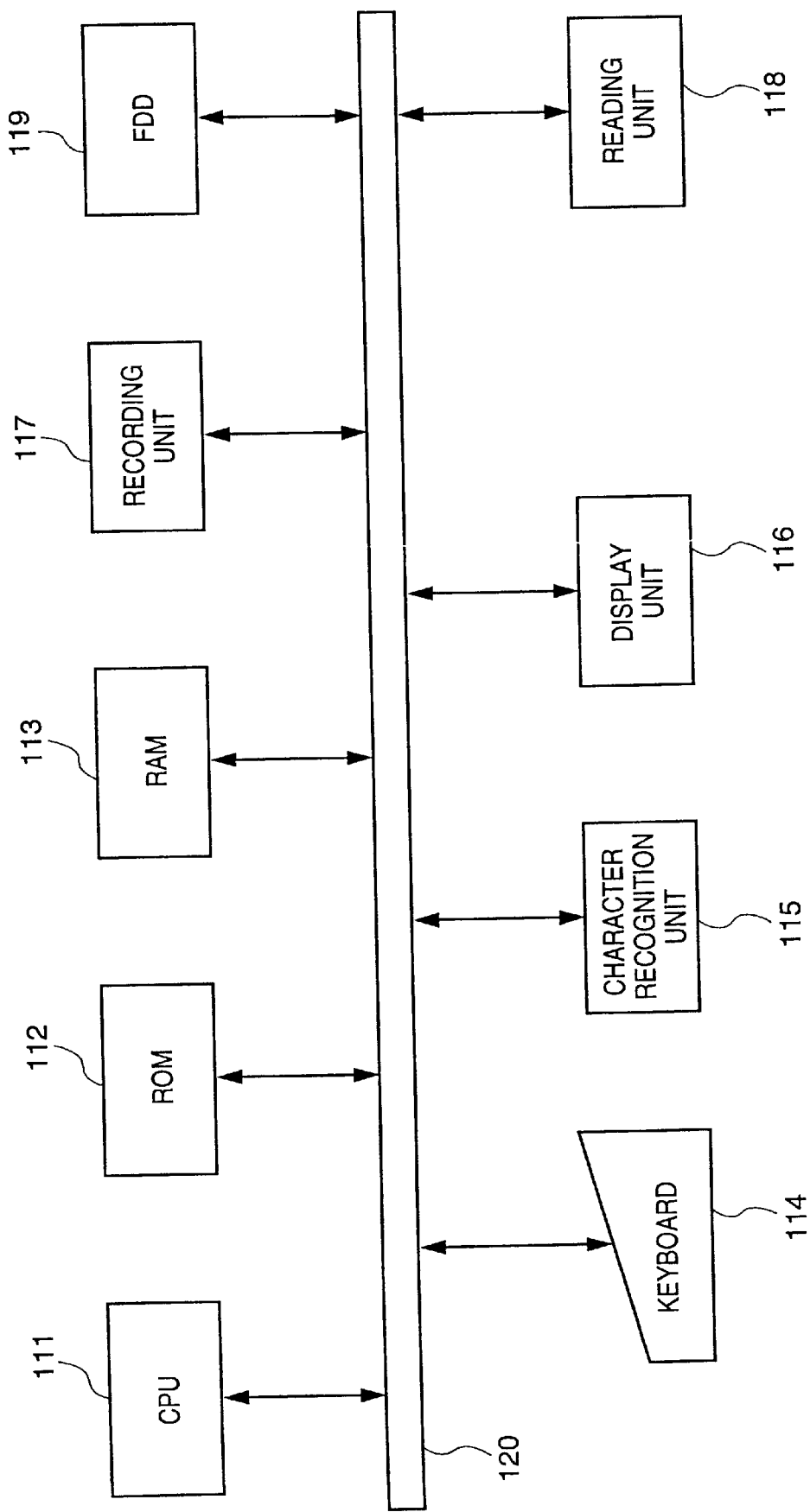
FIG. 12 is a block diagram illustrating the architecture of a character recognition apparatus according to a fourth embodiment of the invention.

FIG. 12 is a block diagram illustrating the architecture of a character recognition apparatus according to a fourth embodiment of the invention.

The apparatus includes a CPU 111 for controlling the operation of a RAM 113, a keyboard 114, a character recognition unit 115, a display unit 116, a recording unit 117 and a reading unit 118 in accordance with a program that has been store in a ROM 112. The ROM 112 stores various programs for executing processing of data entered from the keyboard 114 and character recognition in the character recognition unit 115. The RAM 113 provides a work area and a temporary saving area for various programs and data entered from the keyboard 114.

The keyboard 114 is for designating the start of character recognition, described later, and for entering data. The character recognition unit 115 executes processing to be described later in conjunction with the flowchart of FIG. 14. The display unit 116 displays results of character recognition from the character recognition unit 115 as well as the status of processing. The recording unit 117 records the results of recognition from the character recognition unit 115 on a recording medium in response to a command entered by the user via the keyboard 114.

The reading unit 118 comprises an optical character reader (OCR) for optically reading an image. It is assumed here that read image data are indicative of a simple binary image, where one pixel is represented by one bit. The read image data are developed in the RAM 113 in the form of a bitmap in single bit units. These image data undergo processing described later in conjunction with the flowchart of FIG. 14.

In a case where the image data read by the reading unit 118 become skewed, the skewing of the image data is corrected for before character recognition processing is executed, thereby making it possible to obtain better results with respect to image data from a skewed manuscript. A method of correcting for skewing involves determining the skew of an extracted line and executing a coordinate transformation to eliminate the skewing. A floppy disk drive (FDD) 119 is capable of reading data from and writing data to a loaded floppy disk (not shown). The program of the flowchart described later is written to the loaded floppy disk and processing can be executed by reading the program into the RAM 113 of the apparatus.

It should be noted that a CD-ROM drive or hard disk drive may be provided instead of the FDD 119 and the above-mentioned program may be stored on a CD-ROM or hard disk loaded or installed in the particular driver. Processing can readily be executed by reading the stored program.

The elements constructing the character recognition apparatus described above are interconnected by a CPU bus 120.

In the fourth embodiment, it is assumed that a manuscript read by the reading unit 118 is in the Japanese language, the English language or a mixture of the two.

The details of the character recognition unit 115 will now be described with reference to FIG. 13.

Figure 13:
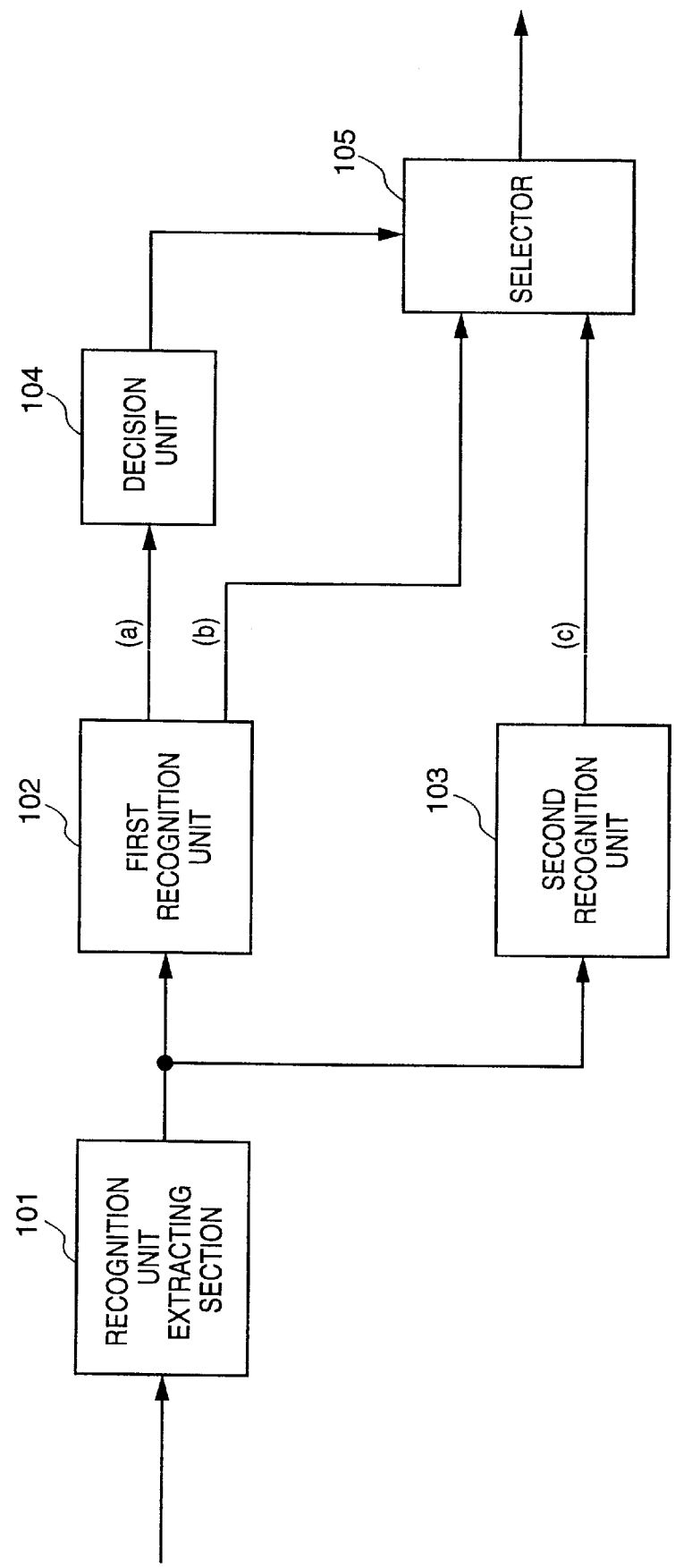
FIG. 13 is a block diagram showing the detailed architecture of a character recognition unit according to the fourth embodiment.

FIG. 13 is a block diagram showing the detailed architecture of the character recognition unit 115 according to the fourth embodiment.

A recognition unit extracting section 101 partitions image data into a plurality of blocks in order that recognition of the image data read by the reading unit 118 may be performed in units of recognition having a predetermined size. The unit of recognition is a character block composed of a collection of characters which occupy a predetermined area, or a line obtained by partitioning the character block in line units, or a character obtained by partitioning the line in character units. This is performed by separating the read image by area separation processing, described later.

A first recognition unit 102 recognizes characters in the Japanese language. This unit performs recognition of image data that have been partitioned into units of recognition by the recognition unit extracting section 101. As the result of recognition performed by the first recognition unit 102, a recognition result 1 [FIG. 13B] is outputted to a selector 105. Furthermore, degree of recognition confidence C1 [FIG. 13A], which indicates the certainty of the recognition result 1, is outputted to a decision unit 104.

A second recognition unit 103 recognizes characters in the English language. This unit performs recognition of image data that have been partitioned into units of recognition by the recognition unit extracting section 101. As the result of recognition performed by the second recognition unit 103, a recognition result 2 [FIG. 13C] is outputted to the selector 105.

The degree of recognition confidence C1 [FIG. 13A] outputted by the first recognition unit 102 enters the decision unit 104 which, on the basis of this value, outputs a one-bit decision signal to the selector 105. The decision unit 104 compares the degree of recognition confidence C1 with a predetermined threshold value T1 and outputs the decision signal as logical "1" if the degree of recognition confidence C1 is greater than the threshold value T1 and as logical "0" if the degree of recognition confidence C1 is less than the threshold value T1. An arrangement may be adopted in which the higher order bit of the degree of recognition confidence C1 is taken and used as the decision signal.

The inputs to the selector 105 are the recognition result 1 from the first recognition unit 102, the recognition result from the second recognition unit 103 and the decision signal from the decision unit 104. On the basis of the decision signal that has entered from the decision unit 104, either recognition result 1 or 2 is selected and outputted as the result of recognition.

The processing of the fourth embodiment will now be described with reference to the flowchart of FIG. 14.

Figure 14:
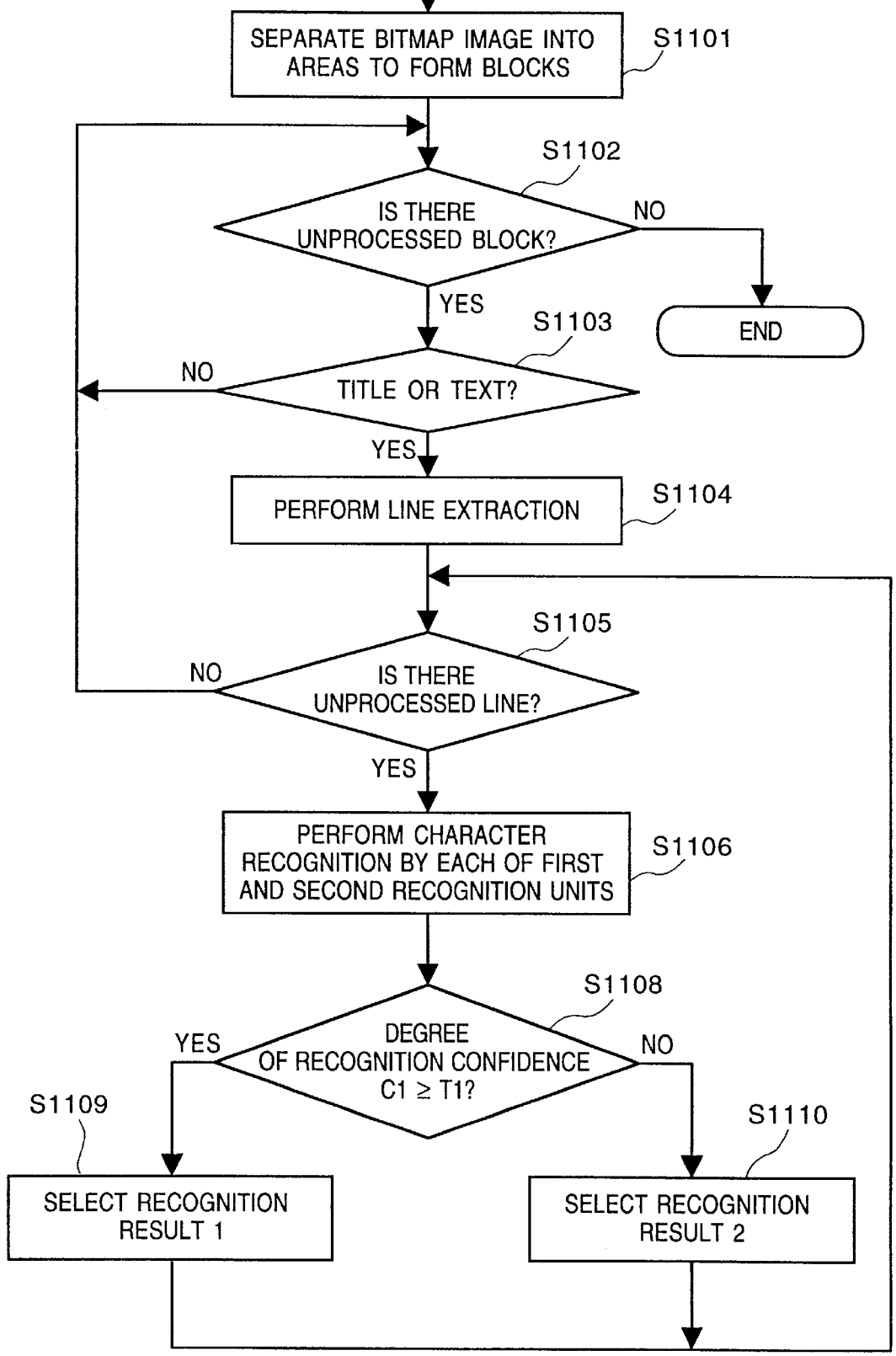
FIG. 14 is a flowchart illustrating the procedure of character recognition processing according to the fourth embodiment.

FIG. 14 is a flowchart illustrating the procedure of character recognition processing according to the fourth embodiment.

In the fourth embodiment, the unit of recognition into which image data are partitioned by the recognition unit extracting section 101 is the "line".

Image data that have been read by the reading unit 118 are partitioned into blocks, of the kind shown below, by area separation processing at step S1101.

Figure 15B:
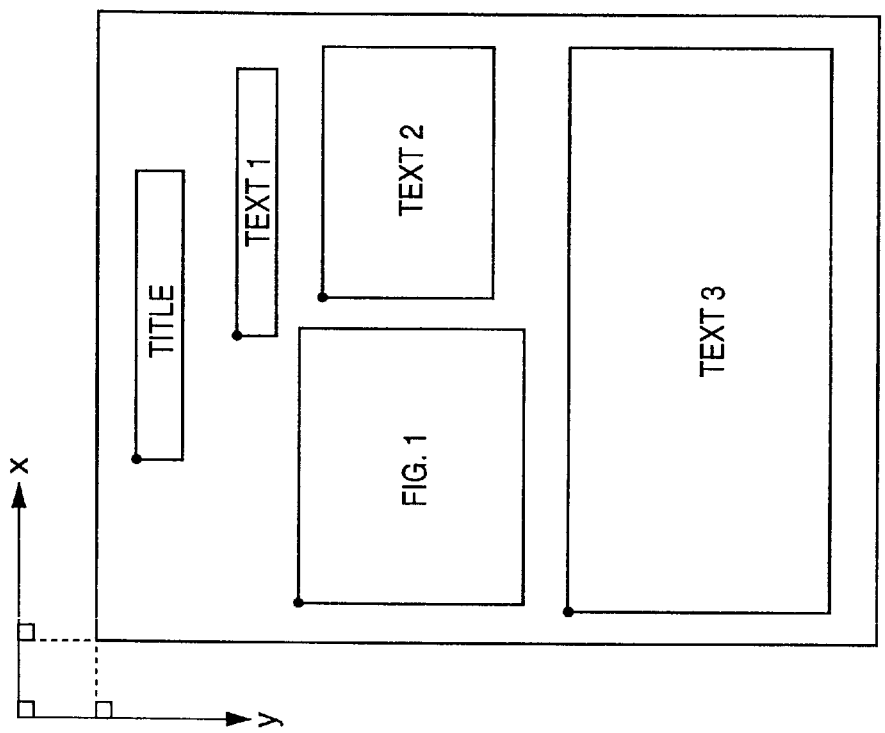
FIG. 15, consisting of FIGS. 15A and B, is a diagram for describing area separation processing according to the fourth embodiment.
Figure 15A:
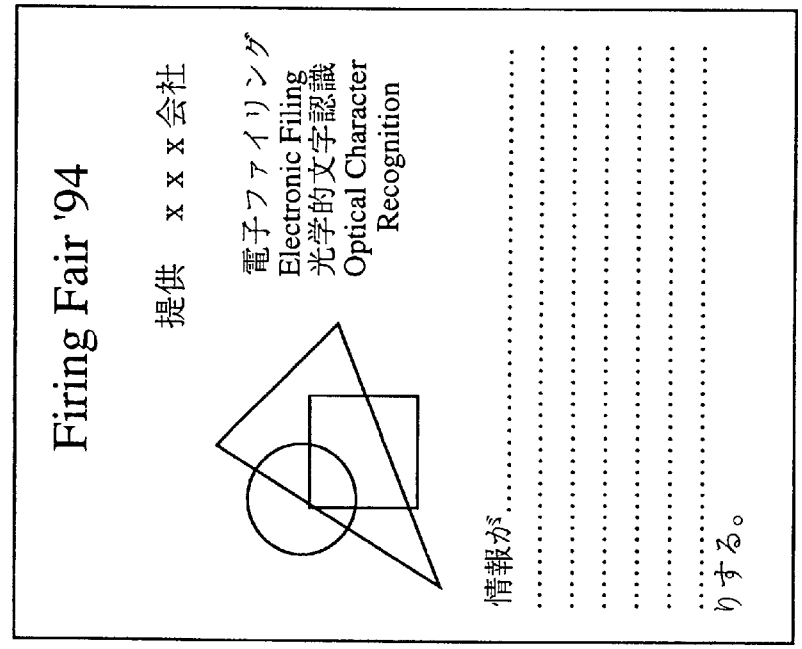

For example; image data that have been read by the reading unit 118 are assumed to be as illustrated in FIG. 15A. Processing for classifying image data according to image data of various types (e.g., titles, text, figures, pictures) in the manner shown in FIG. 15B is area separation. The procedure of such area separation processing will be described with reference to the flowchart of FIG. 16.

Figure 16:
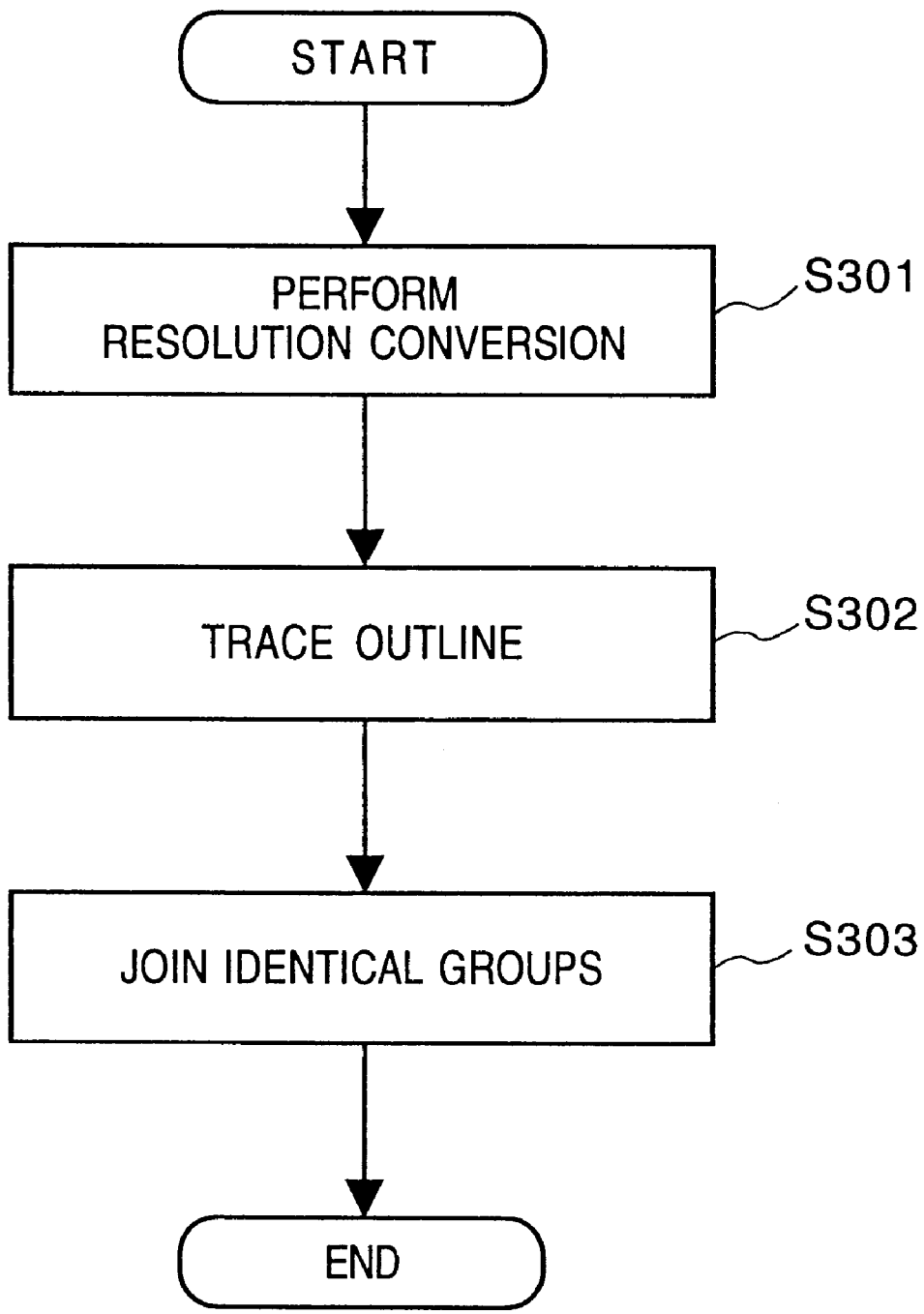
FIG. 16 is a flowchart illustrating the detailed procedure of area separation processing according to the fourth embodiment.

FIG. 16 is a flowchart illustrating the detailed procedure of area separation processing according to the fourth embodiment.

Figure 17:
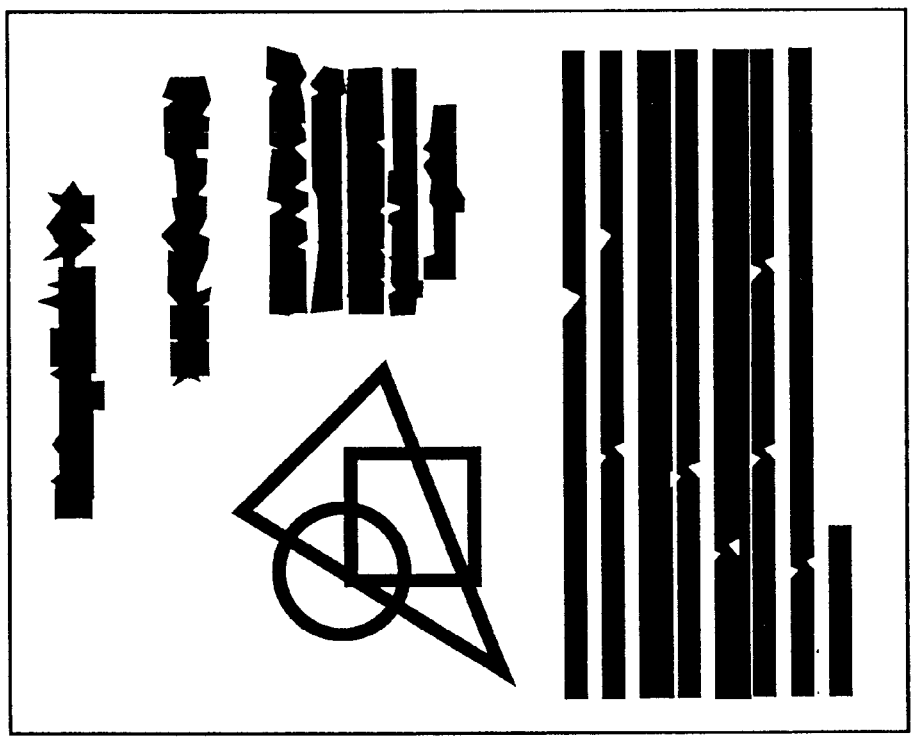
FIG. 17 is a diagram for describing resolution conversion according to the fourth embodiment.

At step S301, image data that have been read are subjected to window processing in each area of m×n pixel units. An area in which even one pixel is a black dot is subjected to a resolution conversion to lower resolution to such an extent that discrete image data in the area become a connected mass. For example, when the image data shown in FIG. 15A are subjected to a resolution conversion, images of the kind depicted in FIG. 17 are obtained.

It should be noted that an area obtained from isolated dots referred to as noise is eliminated by pattern matching or the like performed after window processing.

The images obtained from the resolution conversion are subjected to outline tracing at step S302 in order to ascertain the features of the outline of each image. In a case where the features of an outline are found to indicate a long, slender pattern by this processing, this is judged to be text or a title. Otherwise, the image is judged to be a figure (graphic) or a picture.

In a case where images of identical type neighbor each other, processing for connecting these mutually adjacent images is executed at step S303. This completes the separation of the image data of FIG. 15A to the areas shown in FIG. 15B. When this area separation processing is completed, a data structure indicating types of image data of the kind illustrated in FIG. 18A and block data indicating the disposition of blocks resulting from area separation as shown in FIG. 18B are obtained. Information relating to processing, such as the order in which character recognition is performed, is acquired in accordance with this data structure and block data.

The data structure in FIG. 18A and the block data in FIG. 18B will now be described.

The data structure illustrated in FIG. 18A defines the type (short type in FIG. 18) of a block (struc BLOCK) resulting from partitioning by area separation, the positional relationship (short startx,starty in FIG. 18), width and height (short width,height in FIG. 18) of each block, and address (struct BLOCK *next_address), which decides the order of each block.

In FIG. 18, 0=TITLE (title), 1=TEXT (text), 2=FIGURE (figure) and 3=PICTURE (picture) are defined as the types of blocks. The numerals defined in each block are used in block data as the type of block decided by area separation. The positional relationship of each block is position with respect to x and y coordinates, as illustrated in FIG. 15B. Specifically, startx is the x coordinate of each block and starty is the y coordinate of each block. With regard to the position of each block, a predetermined corner of the block [the corner indicated by the black dot in FIG. 15B] is adopted as the position of each block. Furthermore, the width and height of each block is the length (the width defined by "width") along the x direction of the block and the length (the height defined by "heights") along the y direction of the block.

As shown in FIG. 18B, the image data illustrated in FIG. 15A are partitioned into five blocks [see FIG. 15B] by area separation. Accordingly, BLK[0]~BLK[4] are given as the numerical order (addresses) of processing applied to the blocks. Also indicated for each block are the block type, coordinates, width and height, described above in connection with FIG. 18A, as well as the address of the block to be processed next.

For example, in case of BLK[0], if the block indicated by BLK[0] is text in FIG. 15B, the block "type" is "0". As for position, the x coordinate startx is "500" and the y coordinate starty is "300". Furthermore, the "width" is "1500" and the "height" is "250". The "next_address", which is the address of the block to be processed next, is "&BLK[1]". The foregoing holds in similar fashion for BLK[1]~BLK[4]. Since no block exists to be processed next follow the block processed last (BLK[4] in FIG. 18), the "next_address", namely the address of the block to be processed next, is "NULL".

With reference again to the flowchart of FIG. 14, it is determined at step S1102 whether the processing of steps S1103 onward, described below, has been completed with regard to each block partitioned from the image data by area separation at step S1101. In other words, processing is executed in accordance with the numerical order of each block. When the processing of a block for which next_address is "NULL" is completed, this means that the processing of all blocks is finished.

It is determined at step S1103 whether a block now about to be processed contains a character (i.e., whether the "type" is "0" or "1"). If the block contains a character ("YES" at step S1103), then the program proceeds to step S1104. If the block does not contain a character ("NO" at step S1103), then the program returns to step S1102.

Figure 19:
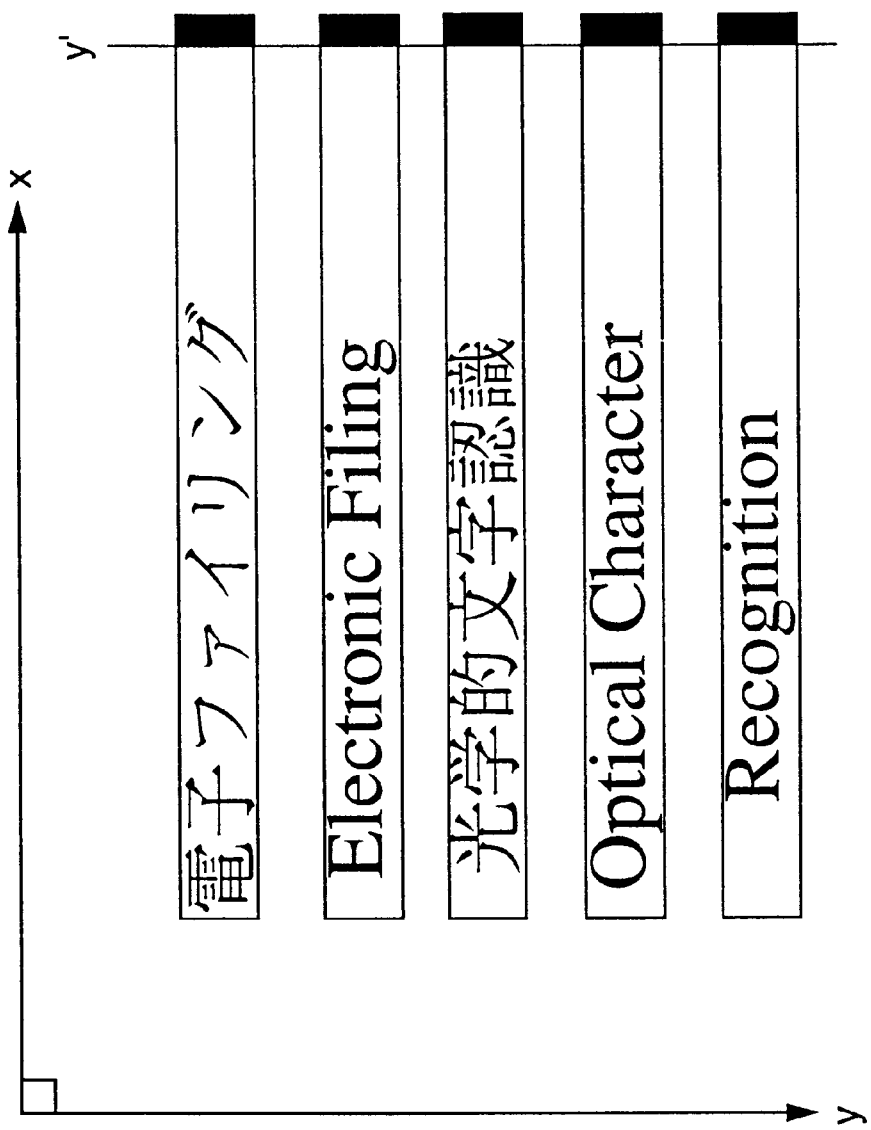
FIG. 19 is a diagram for describing the manner in which lines are extracted by a projection upon the y axis according to the fourth embodiment.

Image data (characters) in the block are projected upon the y axis and the y axis (line) on which the characters exist is extracted at step S1104. If text 2 in FIG. 15B is projected as an example of a projection upon the y axis, a projection appears on y', as shown in FIG. 19, with regard to portions (lines) where the characters exist. A specific method of projecting data upon the y axis will be described with reference to the flowchart of FIG. 20.

Figure 20:
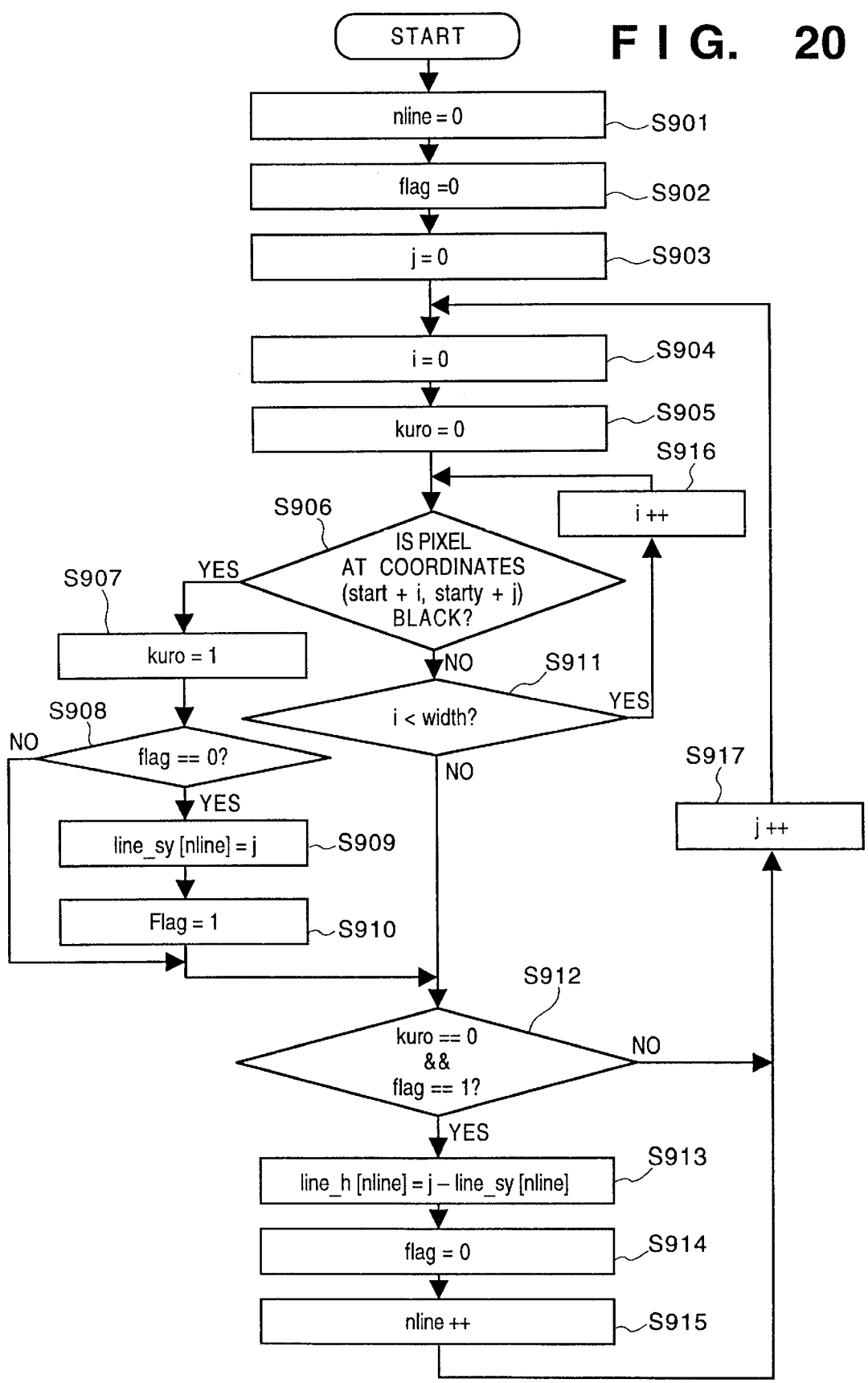
FIG. 20 is a flowchart for describing the procedure of a method of performing a projection upon the y axis according to the fourth embodiment.

FIG. 20 is a flowchart for describing the procedure of a method of performing a projection upon the y axis according to the fourth embodiment.

Since the characters present in each block are bitmap images of one bit, the projection upon the y axis is performed as follows: The image in a block is searched in single-bit units while determining whether a pixel is "black" or "white", and the projection is carried out based upon the determination and the results of the search. Initialization of values described at steps S901~S905 is performed when processing for projecting the image data upon the y axis begins.

In a block containing image data representing characters, "nline", which indicates the number of lines in the block, is reset at step S901. A flag "flag" indicating whether the beginning of a line or the end of a line is being retrieved is reset at step S902. A counter j for counting the number of times a search is performed in the y direction is reset at steep S903. A counter i for counting the number of times a search is performed in the x direction is reset at steep S904. A flag "kuro" indicating whether a pixel situated at a value indicated by the pointer i is black is reset at step S905.

Whether the pixel situated at coordinates (startx+i, starty+j) is black is determined at step S906. If the pixel is black ("YES" at step S906), then the program proceeds to step S907. If the pixel is not black, i.e., if it is a white pixel ("NO" at step S906), then the program proceeds to step S911.

It is determined at step S911 whether startx+i is equal to or greater than the width of the block. If it is equal to or greater ("NO" at step S911), then the program proceeds to step S912. If it is less ("YES" at step S911), then the program proceeds to step S916. The value of i is incremented by +1 at step S916 and then the program returns to step S906.

The flag "kuro" is set to "1" at step S907. This is followed by step S908, at which it is determined whether the flag "flag" is "0" (i.e., whether this is the mode for searching for the beginning of a line). If the flag "flag" is "0" ("YES at step S908), then the program proceeds to step S909. If the flag "flag" is not "0" ("NO at step S908), then the program proceeds to step S912.

The value of j is substituted into line_sy[nline], which indicates the line for which the y coordinate is starty+j, at step S909. The flag "flag" is changed to "1" at step S910.

It is determined at step S912 whether the flag "kuro" is "0" (no black characters in the line) and whether the flag "flag" is "1" (the mode for searching for the end of the line). If kuro is "0" and flag is "1" ("YES at step S912), then the program proceeds to step S913.

A value obtained by subtracting the starting position line_sy[nline] of the line from the line currently being processed is substituted into line_h[nline], which indicates the height of the nline-th line extracted by the projection, at step S913. This is followed by step S914, at which the flag "flag" indicating whether line extraction is to be performed or not is restored to the mode for searching for the beginning of the line. Next, nline indicating the number of lines is incremented by +1 at step S915, after which the program proceeds to step S917. On the other than, if kuro is found to be "0" and flag is found not to be "1" ("NO at step S912), then the program proceeds to step S917, the value of j is incremented by +1 and the program returns to step S904.

The foregoing processing makes it possible to extract the number of lines from a character image, the starting point of each line and the height thereof.

Figure 21:
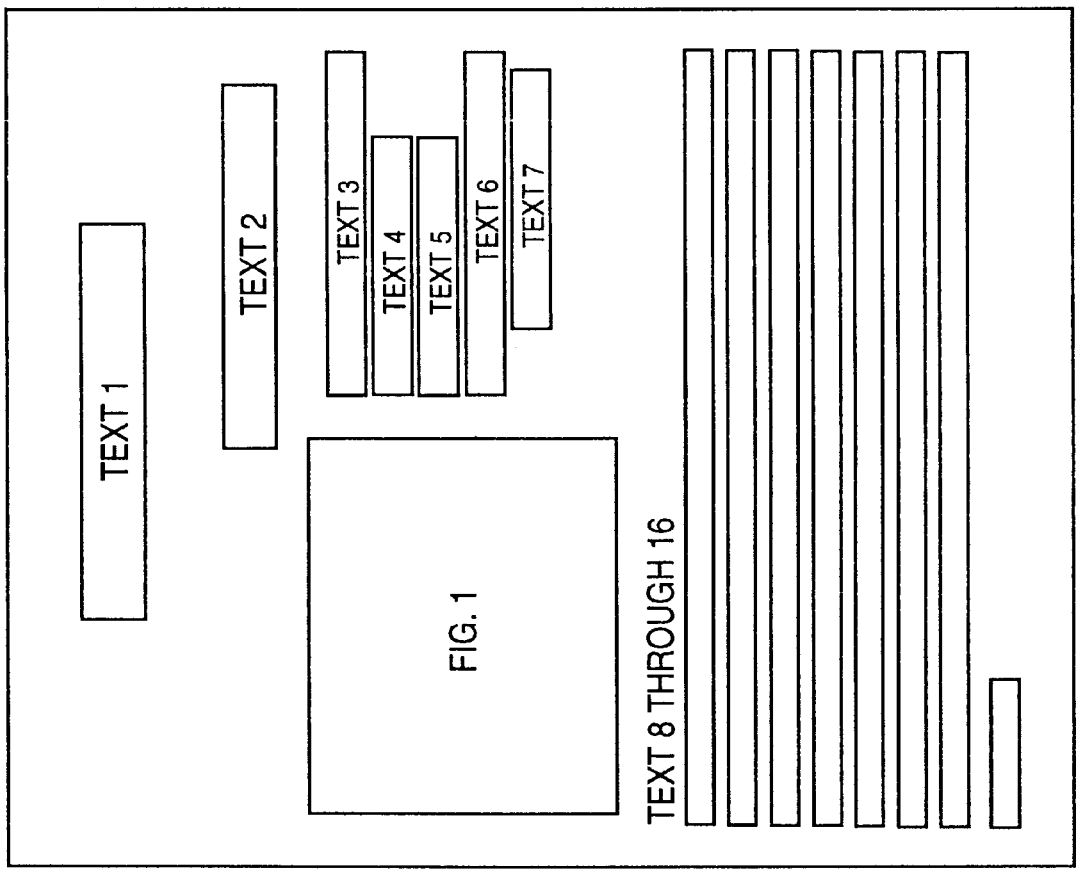
FIG. 21 is a diagram showing the results of area separation processing according to another configuration of the fourth embodiment.

The method of extracting lines described above in connection with the flowchart of FIG. 20 involves projecting image data (characters) in a block upon the y axis and extracting the y axis (line) on which the characters exist. However, this does not impose a limitation upon the invention. For example, after the outline tracing of step S302 in the flowchart of FIG. 16 is performed, a long, slender object from among the objects extracted by outline tracing is judged to be characters. However, area separation is executed in the form of lines without joining identical groups at step S303. When this processing is applied to the image data of FIG. 15A, the result is a shown in FIG. 21, and lines are extracted at the time of area separation. However, since the accuracy of lines extracted at the time of resolution conversion is low, the size of the predetermined threshold value T1 that takes this accuracy into account must be set.

With reference again to the flowchart of FIG. 14, it is determined at step S1105 whether recognition processing of each line extracted at step S1104 has ended. If recognition processing of all lines has ended ("NO" at step S1105), then the program proceeds to step S1102. If recognition processing of all lines has not ended ("YES" at step S1105), then the program proceeds to step S1106.

At step S1106 character recognition is performed in line units by the first recognition unit 102 to obtain recognition result 1 and degree of recognition confidence C1. At the same time, recognition is performed in line units by the second recognition unit 103 to obtain recognition result 2.

It is determined at step S1108 whether the degree of recognition confidence C1 is equal to or greater than the predetermined threshold value T1. If the degree of recognition confidence C1 is equal to or greater than the threshold value T1 ("YES" at step 1108), then the program proceeds to step S1109, where recognition result 1 is selected as the result of recognition. If the degree of recognition confidence C1 is less than the threshold value T1 ("NO" at step 1108), then the program proceeds to step S1110, where recognition result 2 is selected as the result of recognition. The recognition processing of steps S1106~S1110 is applied to all lines. This will complete character recognition of all lines contained in the block.

In accordance with the fourth embodiment, as described above, the first recognition unit 102 for the Japanese language and the second recognition 103 for the English language are provided and processing for recognizing the read manuscript is performed in parallel fashion by each of the recognition units. Owing to the fact that the results of recognition are decided based upon the degree of recognition confidence C1 obtained by the first recognition unit 102, character recognition can be performed without the user confirming whether the manuscript is in English or Japanese before the reading unit 118 is made to read the manuscript.

It should be noted that the reading unit 118 can readily be constructed to be independent of document orientation by detecting the orientation of image data, using, say, the detection methods described in the first through third embodiments, when the image data such as text or title image data are read by the reading unit 118.

The processing of the flowchart of FIG. 14 according to the fourth embodiment may be replaced by the processing described below in conjunction with the flowchart of FIG. 22.

Figure 22:
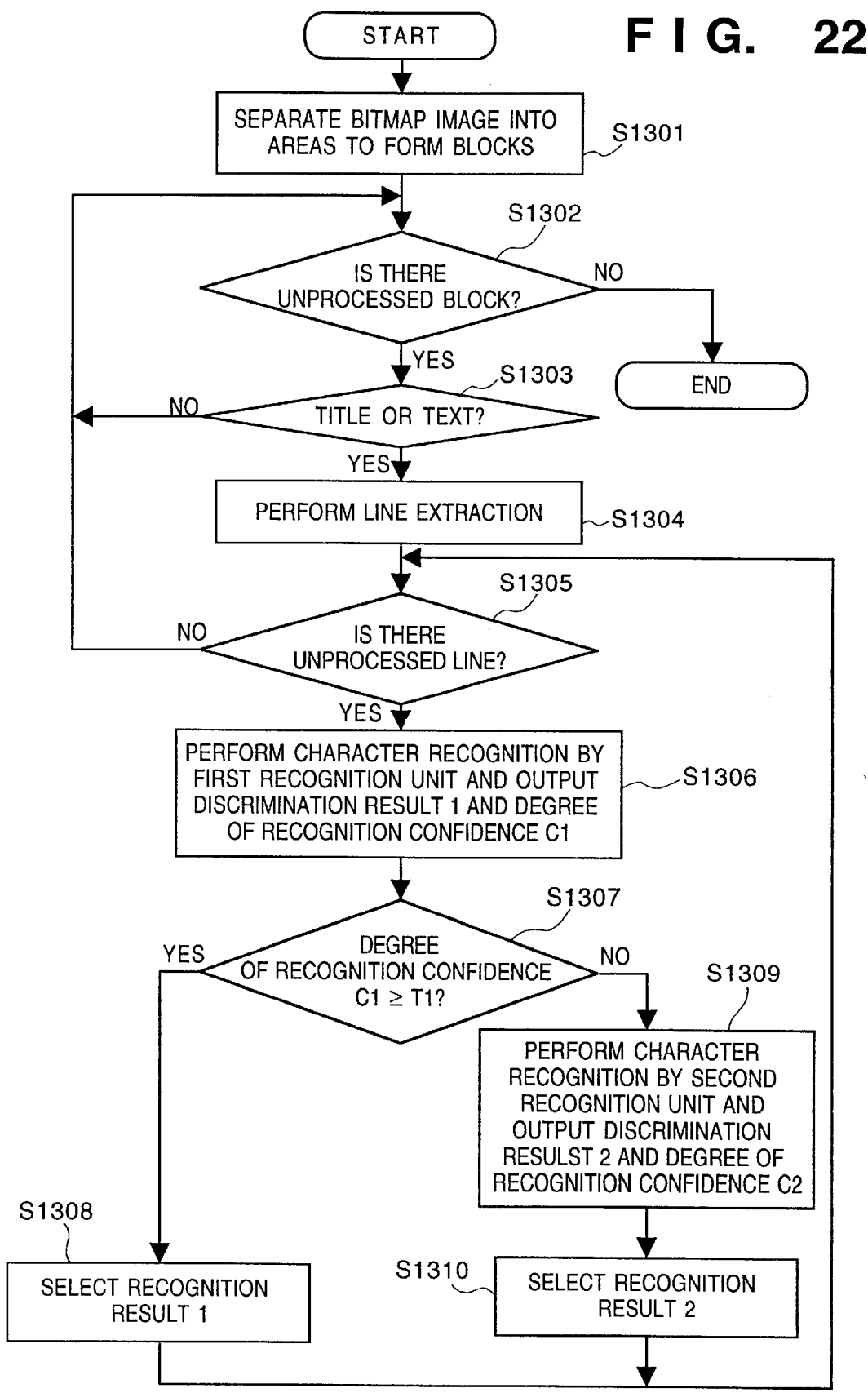
FIG. 22 is a flowchart illustrating the procedure of character recognition processing according to another configuration of the fourth embodiment.

The processing of steps S1301 through S1305 in FIG. 22 is the same as the processing of steps S1101 through S1105 in FIG. 22 and need not be described again.

Character recognition is performed and recognition result 1 and degree of recognition confidence C1 are obtained by the first recognition unit 102 at step S1306. It is determined at step S1307 whether the degree of recognition confidence C1 is equal to or greater than the threshold value T1. If the degree of recognition confidence C1 is equal to or greater than the threshold value T1 ("YES" at step S1307), then the program proceeds to step S1308 and recognition result 1 is selected as the result of recognition. If degree of recognition confidence C1 is less than the threshold value T1, on the other hand ("NO" at step S1307), the program proceeds to step S1309.

Character recognition is performed and recognition result 2 and a degree of recognition confidence C2 are obtained by the second recognition unit 103 at step S1309. The recognition result 2 is selected as the result of recognition at step S1310. The recognition processing of steps S1306~S1310 is applied to all lines. This will complete character recognition of all lines contained in the block.

By executing the processing described in connection with FIG. 22, character recognition in the second recognition unit 103 is carried out only in a case where the degree of recognition confidence C1 is found to be less than the predetermined threshold value T1 at step S1307. Consequently, in a case where character recognition is completed solely by recognition processing based upon recognition result 1, there is no need for processing to be executed by the second recognition unit 103. This makes it possible to speed up processing.

Figure 23:
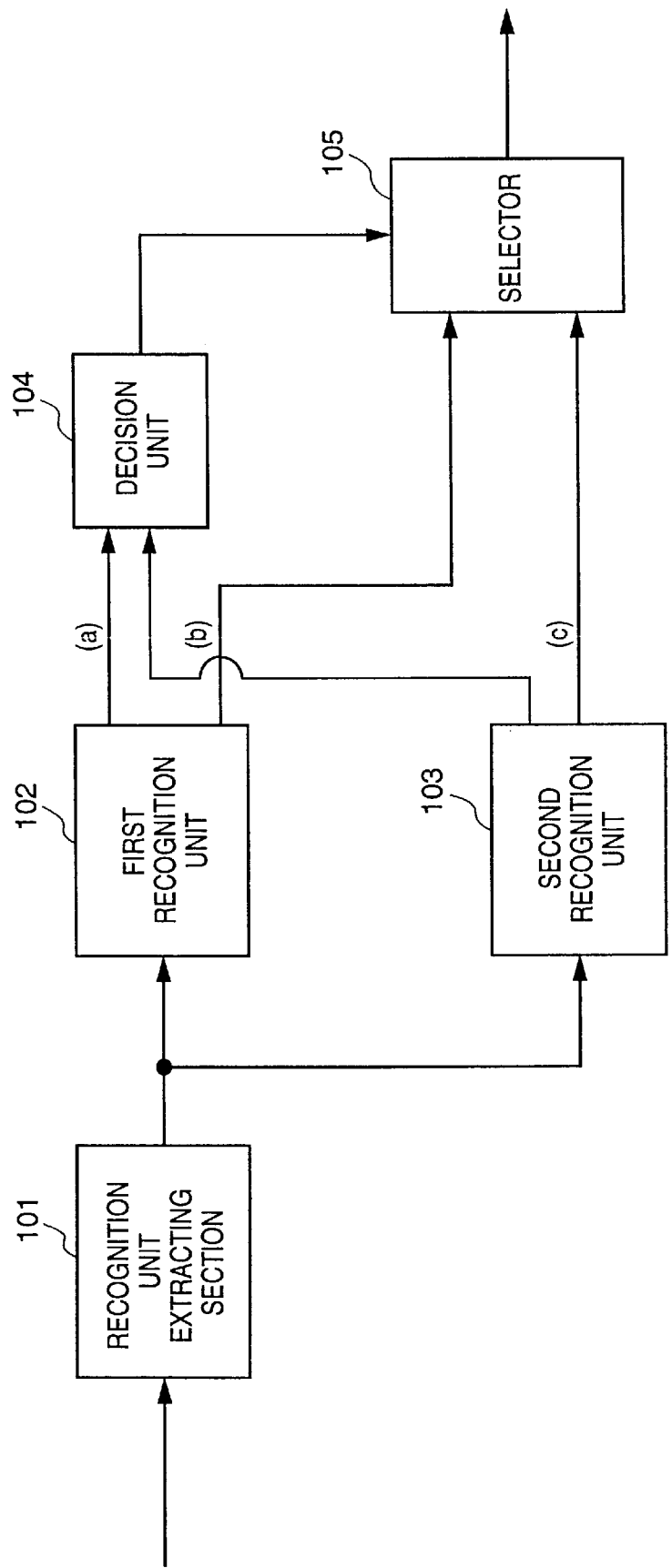
FIG. 23 is a block diagram illustrating the detailed architecture of a character recognition unit according to another configuration of the fourth embodiment.

In the fourth embodiment, the degree of recognition confidence C1 obtained in the first recognition unit 102 is outputted. However, this does not impose a limitation upon the invention. For example, an arrangement may be adopted in which the degree of recognition confidence C2 [FIG. 23D] is outputted by the second recognition unit 103, as illustrated in FIG. 23. In this case, the decision unit 104 compares the degree of recognition confidence C1 and degree of recognition confidence C2 and outputs the decision signal to the selector 105 in such a manner that the higher degree of recognition confidence is outputted as the results of recognition. Accordingly, the better result of recognition is selected as the result of recognition by the selector 105. Further, in a case where the ranges or rankings of the degrees of recognition confidence of the first recognition unit 102 and second recognition unit 103 are different, the decision unit 104 may be provided with a converter (not shown) for making the ranges or rankings of the two equivalent, in which case it will suffice for the results of recognition by the two recognition units to be compared after processing is first executed by the converter.

In the fourth embodiment, the units of character recognition in a block judged to be a title or text are line units in the recognition units and character recognition is performed for each line contained in the block. However, this does not impose a limitation upon the invention. For example, the first line of a block judged to be a title or text may be extracted and this line may be subjected to character recognition processing by the first recognition unit 102 and second recognition unit 103. When the first recognition unit 102 or the second recognition unit 103 has been selected as the result of recognition, all of the remaining image data in the block may be subjected to character recognition using the selected recognition unit 102 or 103.

Further, line extraction may be performed by projecting, upon the y axis, the image data in a block judged to be a title or text, and performed character extraction by a projection upon the x axis. Any m-number of characters may be extracted from a block that has been partitioned into lines and characters, and the extracted m-number of characters may be subjected to character recognition processing by the first recognition unit 102 and second recognition unit 103. When the first recognition unit 102 or the second recognition unit 103 has been selected as the result of recognition, all of the remaining image data in the block may be subjected to character recognition using the selected recognition unit 102 or 103.

The processing time needed for character recognition processing can be shortened by adopting this arrangement.

In the fourth embodiment, the image data subjected to area separation processing by the recognition unit extracting section 101 of FIG. 13 represent an image of one bit per pixel. However, this does not impose a limitation upon the invention. For example, area separation can be applied to a multivalued image of eight bits per pixel. The area separation processing in such case would entail applying a differential filter to the image data to extract the high-frequency components of the image data and subjecting text data and image data to area separation based upon the results obtained. In a case where it is necessary to distinguish between the English and Japanese languages, as in the fourth embodiment, area separation processing would be executed after the multivalued image data of eight bits per pixel are made binary data using a fixed threshold value as a reference.

<Fifth Embodiment>

In the fourth embodiment, recognition units for the Japanese and English languages are provided so that characters in these two languages may be recognized. However, recognition units for a plurality of languages may be provided as extensions so that character recognition in a plurality of languages not limited to Japanese and English can be carried out simultaneously.

Figure 24:
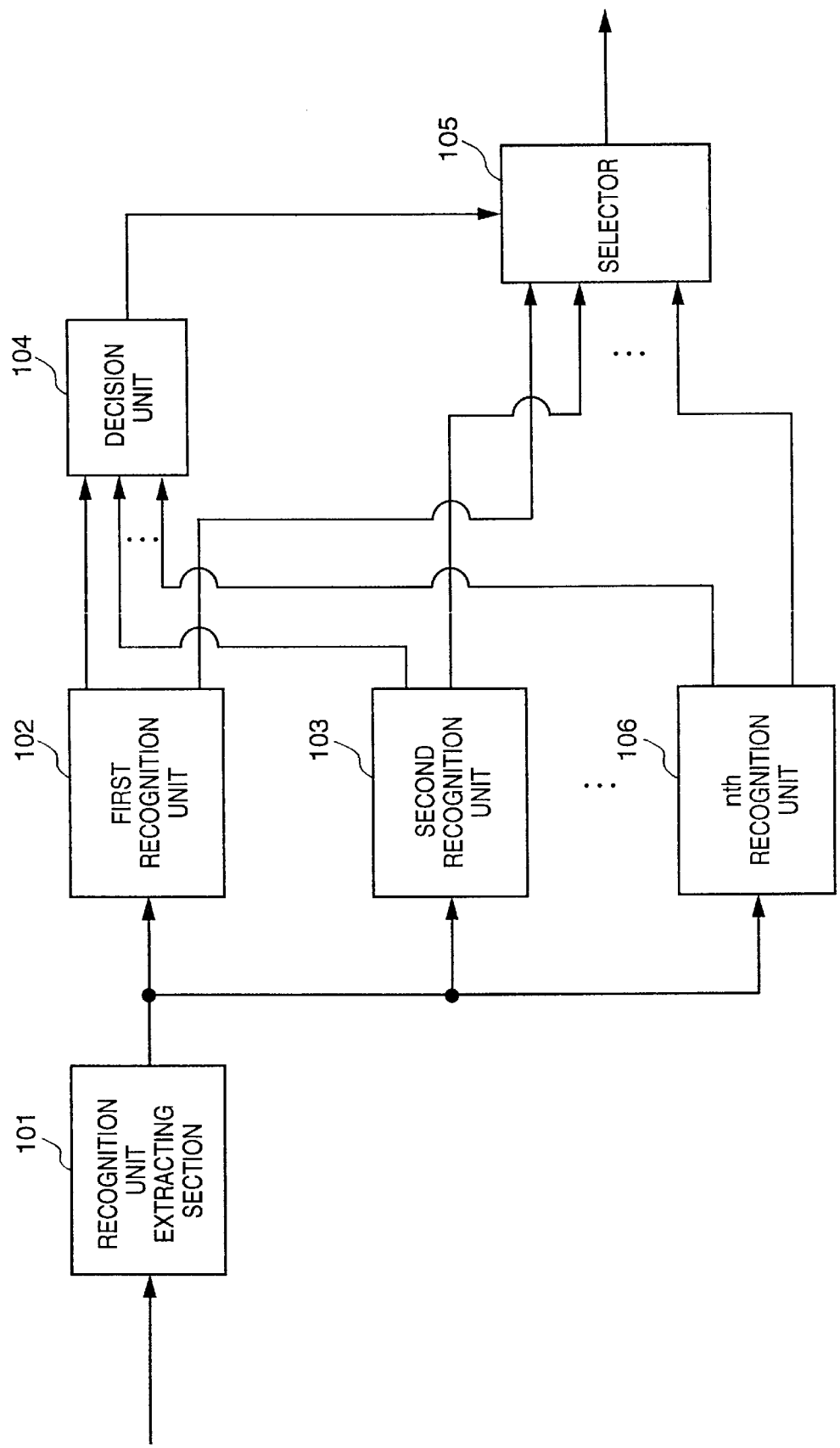
FIG. 24 is a block diagram illustrating the detailed architecture of a character recognition unit according to the fourth embodiment.

For example, as shown in FIG. 24, first recognition unit 102, second recognition unit 103, . . . , n-the recognition unit 106 are provided for corresponding ones of n-number of languages (where n is a positive integer). Recognition result 1, recognition result 2, . . . , recognition result n are outputted to the selector 105 from the recognition units 102~106. Further, degree of recognition confidence C1, degree of recognition confidence C2, . . . , degree of recognition confidence Cn are outputted to the decision unit 104. The latter compares there entered degrees of recognition confidence C1~Cn and, on the basis of the comparison, outputs a decision signal of log2(n) bits to the selector 105. In accordance with this decision signal, the selector 105 selects one of the recognition results 1~n as the result of recognition.

Character recognition processing for a case where three recognition units, namely the first recognition unit 102, the second recognition unit 103 and a third recognition unit (not shown), are provided will now be described with reference to the flowchart of FIG. 25.

Figure 25:
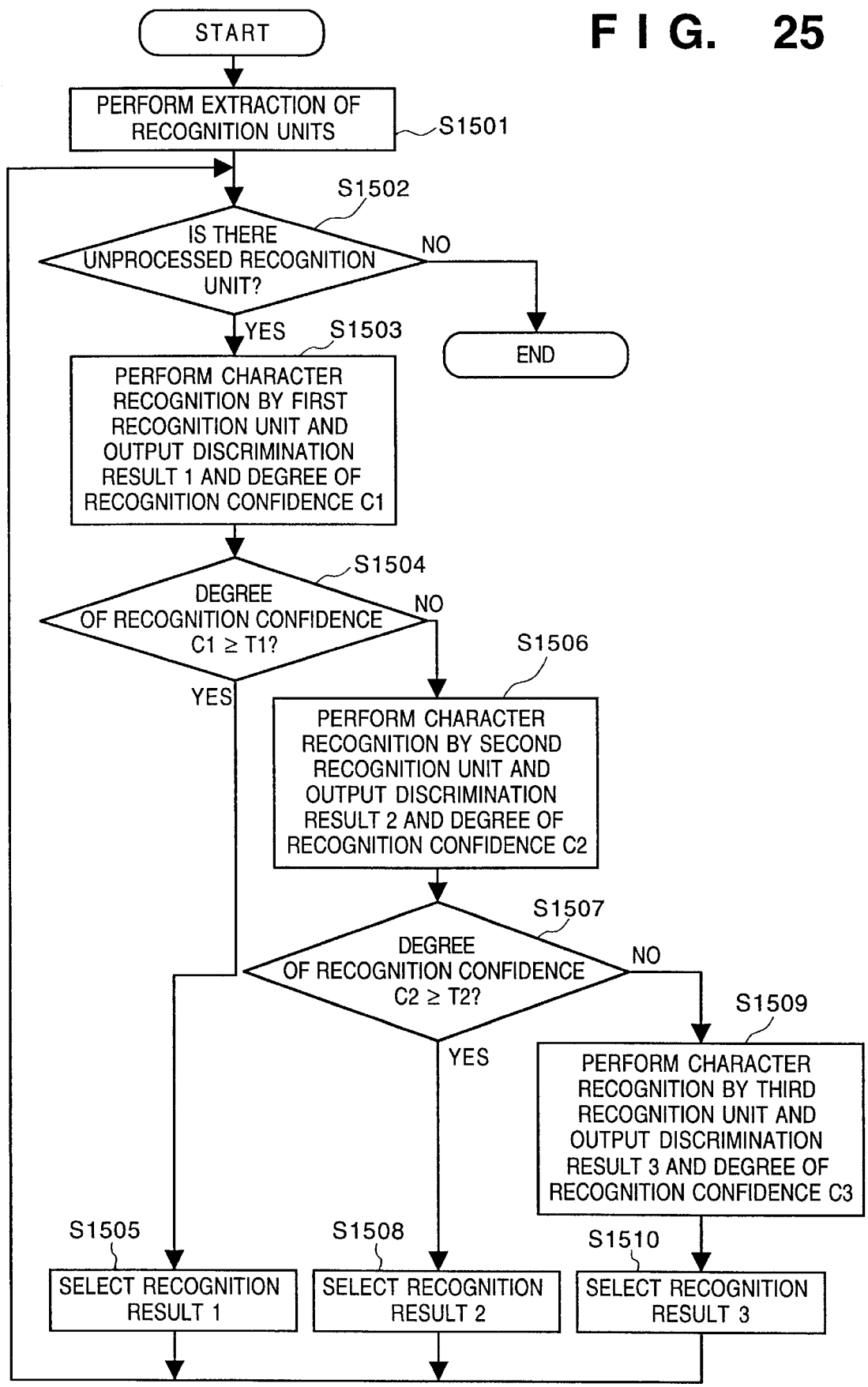
FIG. 25 is a flowchart illustrating the procedure of character recognition processing according to a fifth embodiment of the present invention.
Figure 26A:
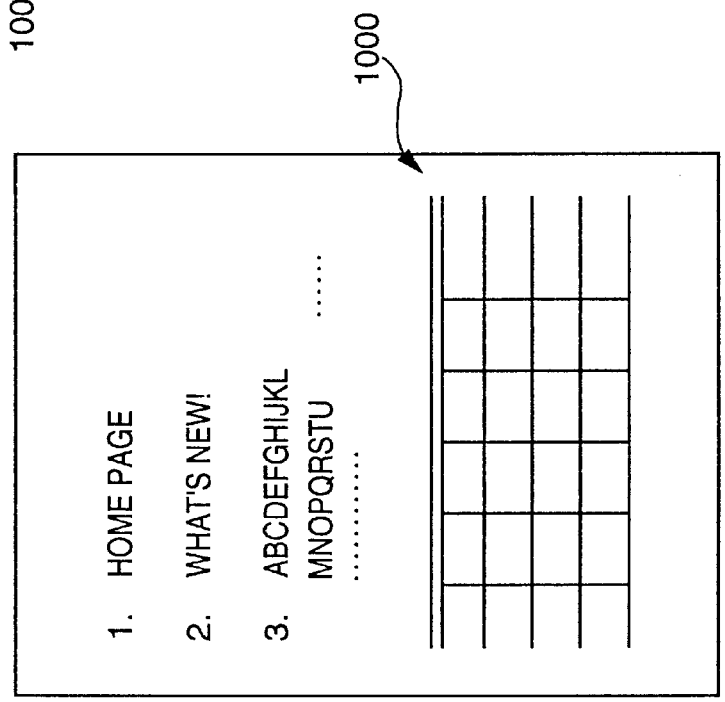
FIG. 26, consisting of FIGS. 26A and B, is a diagram for describing a typical technique for automatically discriminating the orientation of a document.
Figure 26B:
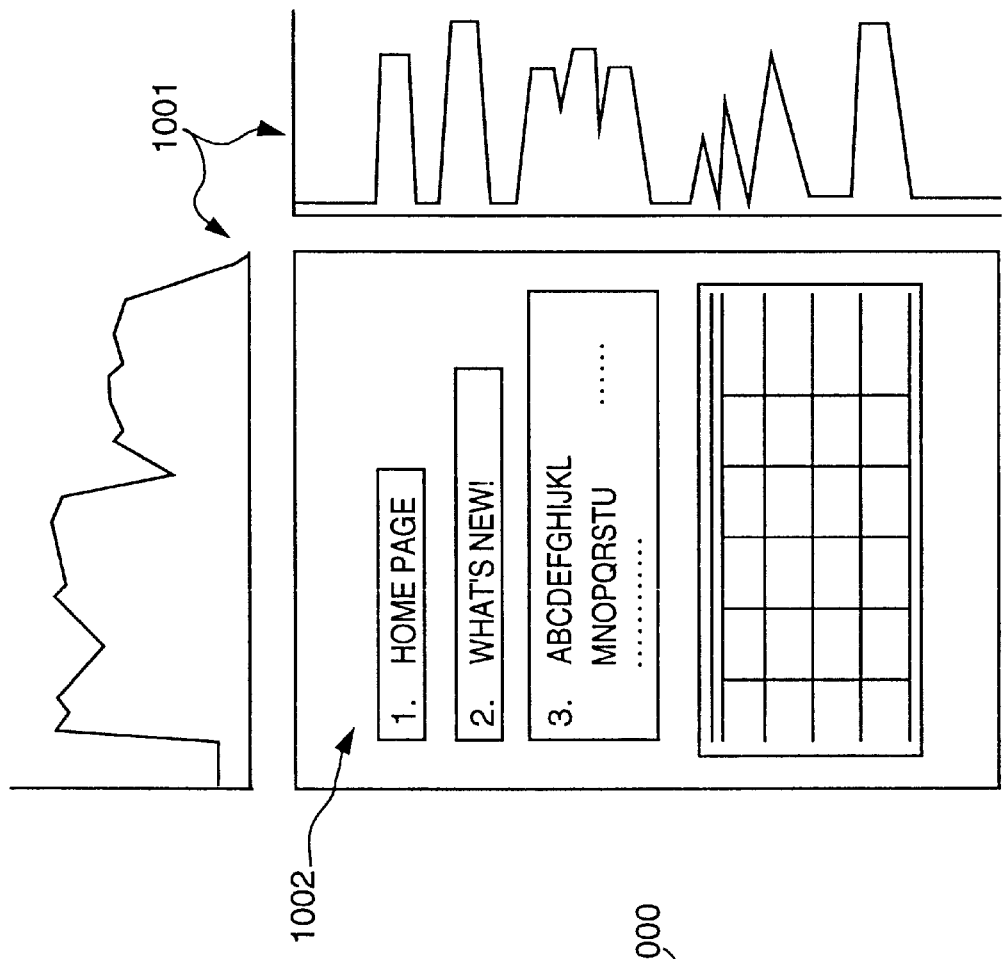
Figure 27D:
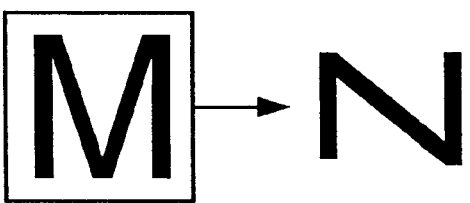
FIGS. 27A through D are diagrams illustrating the results of subjecting the character "M" to recognition in various orientations of the character in a case where the direction in which the character is read has been rotated.
Figure 27C:
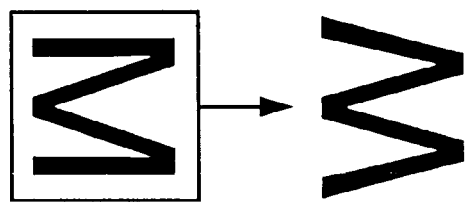
Figure 27B:
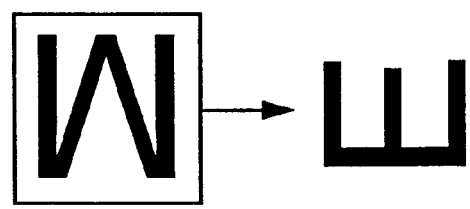
Figure 27A:
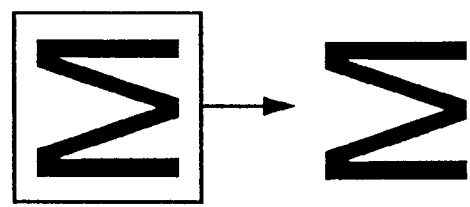
Figure 28B:
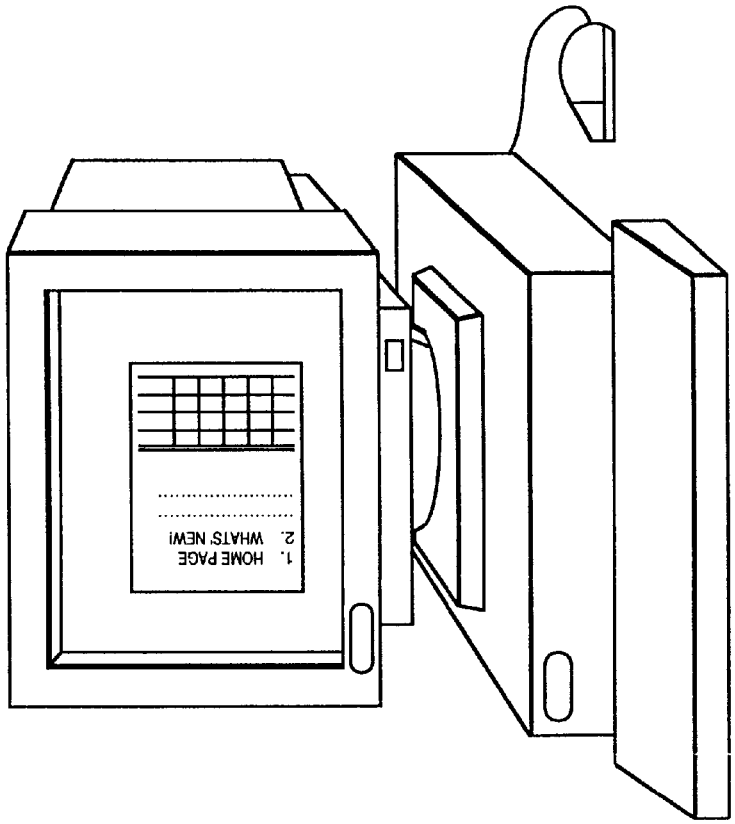
FIGS. 28A, B are diagrams illustrating image data, which have been read in by a scanner, when the data are displayed on a monitor.
Figure 28A:
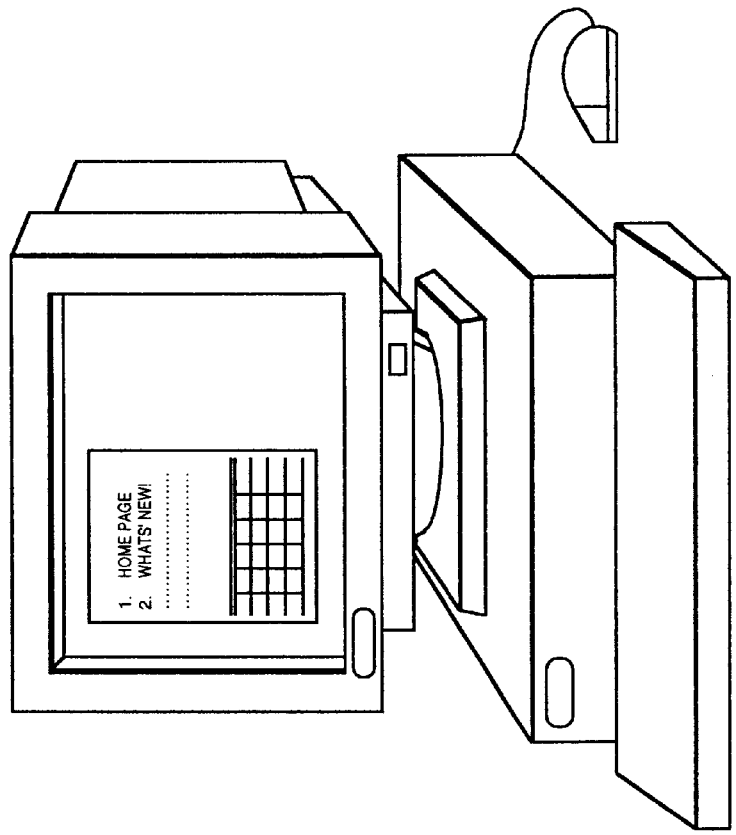
Figure 29A:
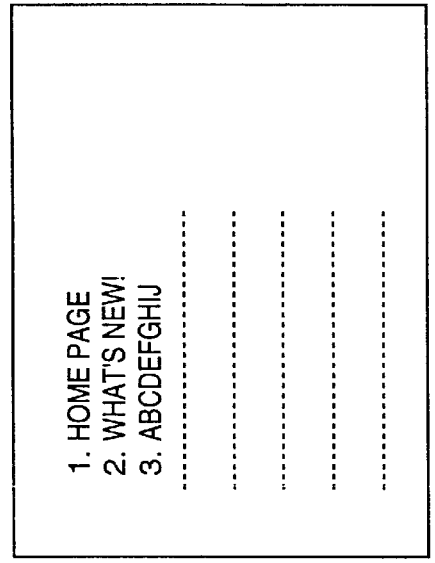
FIGS. 29A through D are diagrams for describing various dispositions of documents on paper.
Figure 29B:
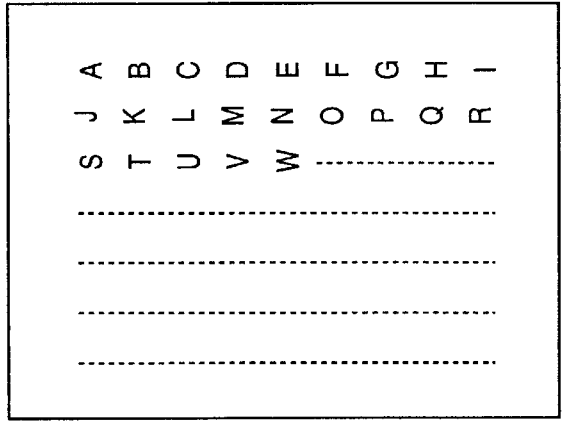
Figure 29C:
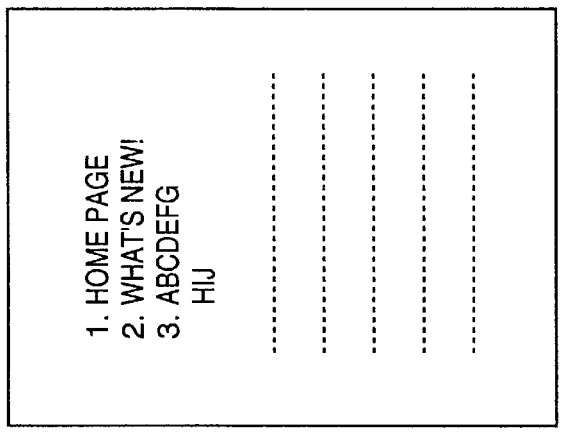
Figure 29D:
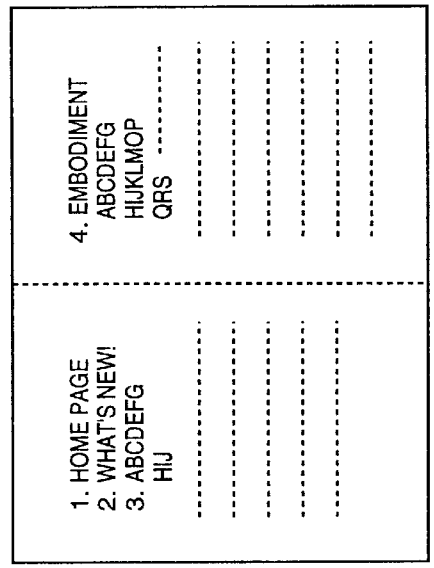
Figure 30A:
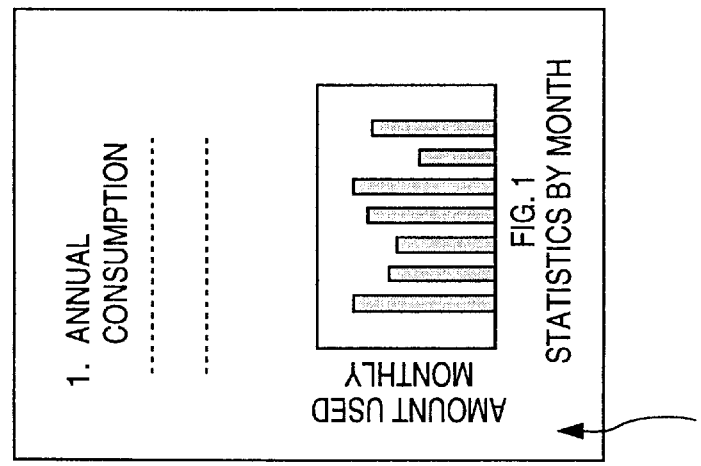
FIGS. 30A through C are diagrams illustrating examples of characters in which characters having different orientations are mixed on a single page of a manuscript.
Figure 30B:
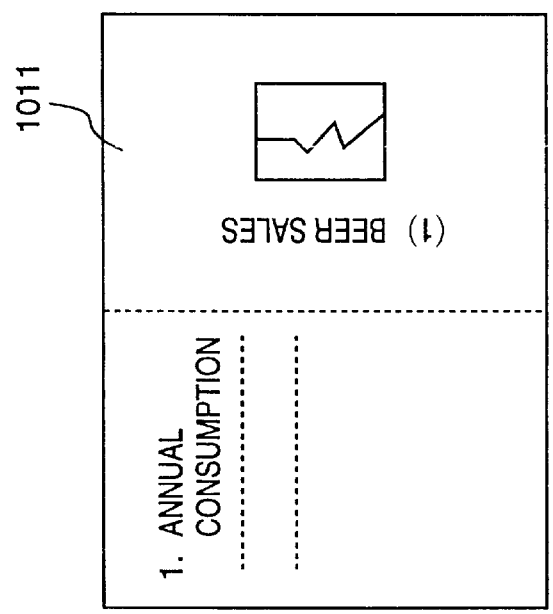
Figure 30C:
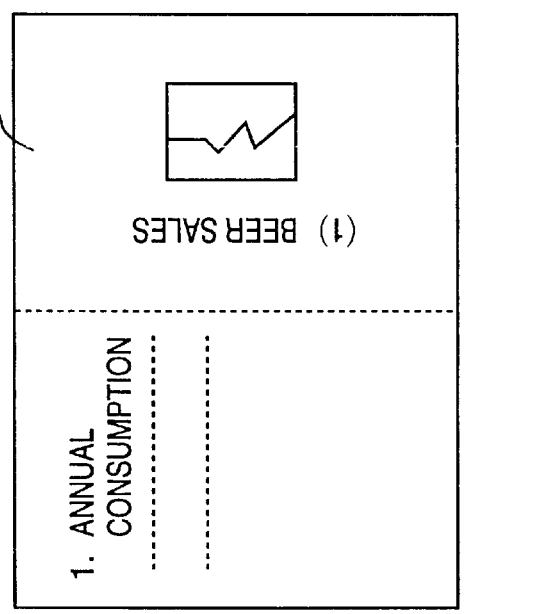

FIG. 25 is a flowchart illustrating the procedure of character recognition processing according to a fifth embodiment of the present invention.

Area separation based upon units of recognition of the image data is performed by the recognition unit extracting section 101 at step S1501. This is followed by step S1502, at which it is determined whether character recognition processing has been completed with regard to each block partitioned by area separation at step S1501. In a case where character recognition processing has been completed for each block ("NO" at step S1502), processing is terminated. In a case where character recognition processing has not been completed for each block ("YES" at step S1502), the program proceeds to step S1503.

Character recognition is performed and the recognition results 1 and degree of recognition confidence C1 are obtained by the first recognition unit 102 at step S1503. It is determined at step S1504 whether the degree of recognition confidence C1 is equal to or greater than the predetermined threshold value T1. If the degree of recognition confidence C1 is equal to or greater than the threshold value T1 ("YES" at step S1504), then the program proceeds to step S1505 and recognition result 1 is selected as the result of recognition. If degree of recognition confidence C1 is less than the threshold value T1, on the other hand ("NO" at step S1504), the program proceeds to step S1506.

Character recognition is performed and recognition result 2 and the degree of recognition confidence C2 are obtained by the second recognition unit 103 at step S1506. It is determined at step S1507 whether the degree of recognition confidence C2 is equal to or greater than a predetermined threshold value T2. If the degree of recognition confidence C2 is equal to or greater than the threshold value T2 ("YES" at step S1507), then the program proceeds to step S1508 and recognition result 1 is selected as the result of recognition. If the degree of recognition confidence C2 is less than the predetermined threshold value T2, on the other hand ("NO" at step S1507), the program proceeds to step S1509.

Character recognition is performed and recognition result 3 is obtained by the third recognition unit (not shown) at step S1509.

The recognition processing of steps S1504~S1510 is applied to all blocks. This will complete recognition processing of each block.

Though three recognition units are provided in the fifth embodiment, this does not impose a limitation upon the invention. Any number of recognition units may be provided depending upon the number of languages in which recognition is performed. For example, in a case where the apparatus includes n-number of recognition units, recognition result n is selected if the condition $Cn \geq Tn$ is satisfied, where Cn represents the recognition result of the recognition unit n and Tn represents the degree of recognition confidence. If the condition $Cn \geq Tn$ is not satisfied, processing by the recognition units from the (n+1)th recognition unit onward is executed and the recognition result of the recognition unit that satisfies the above-mentioned condition is selected as the result of recognition.

Further, the order in which recognition is performed by the recognition units 1~n is in accordance with a predetermined sequence. However, the order can be changed in accordance with user application via the input unit such as the keyboard.

In accordance with the fifth embodiment, as described above, recognition units corresponding to a plurality of languages are provided, thereby making it possible to perform simultaneous character recognition in a plurality of languages efficiently.

The present invention can be applied to a system constituted by a plurality of devices (e.g., a host computer, interface, reader, printer, etc.) or to an apparatus comprising a single device (e.g., a copier or facsimile machine, etc.), as in the foregoing embodiment.

Further, it goes without saying that the object of the present invention can also be achieved by providing a storage medium storing the program codes of the software for performing the aforesaid functions of the embodiments to a system or an apparatus, reading the program codes with a computer (e.g., a CPU or MPU) of the system or apparatus from the storage medium, then executing the program.

In this case, the program codes read from the storage medium realize the functions of the embodiment, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiment are implemented by executing the program codes read by a computer, the present invention covers a case where an operating system (OS) or the like working on the computer performs a part of or the entire process in accordance with the designation of program codes and implements the functions according to the embodiments.

Furthermore, the present invention further covers a case where, after the program codes read from the storage medium are written in a function extension card inserted into the computer or in a memory provided in a function extension unit connected to the computer, a CPU or the like contained in the function extension card or function extension unit performs a part of or the entire process in accordance with the designation of program codes and implements the function of the above embodiment.

In the case where the present invention is applied to the above-mentioned storage medium, program codes corresponding to the flowcharts described earlier are stored on the storage medium. More specifically, modules illustrating examples of the memory maps of FIGS. 31 and 35 are stored on the storage medium.

The structural features of the program according to the first embodiment of the invention are as illustrated in FIG. 31.

Figure 31B:
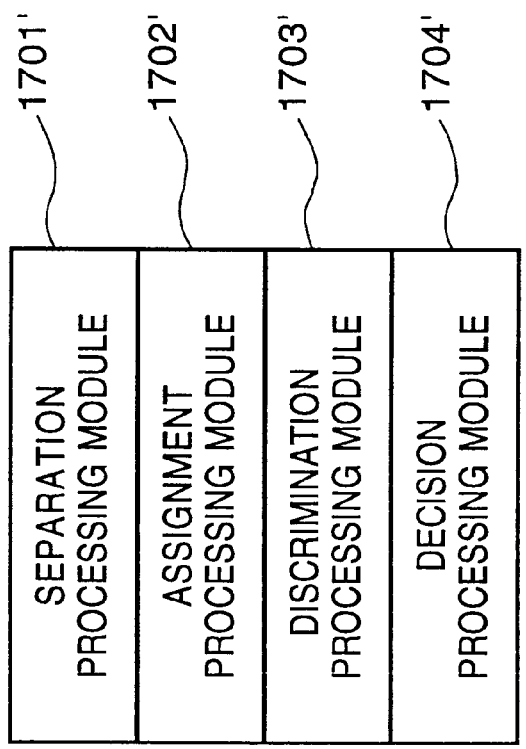
FIGS. 31A, B are diagrams illustrating the structure of the memory map of a storage medium storing program codes for implementing the first embodiment of the invention.
Figure 31A:
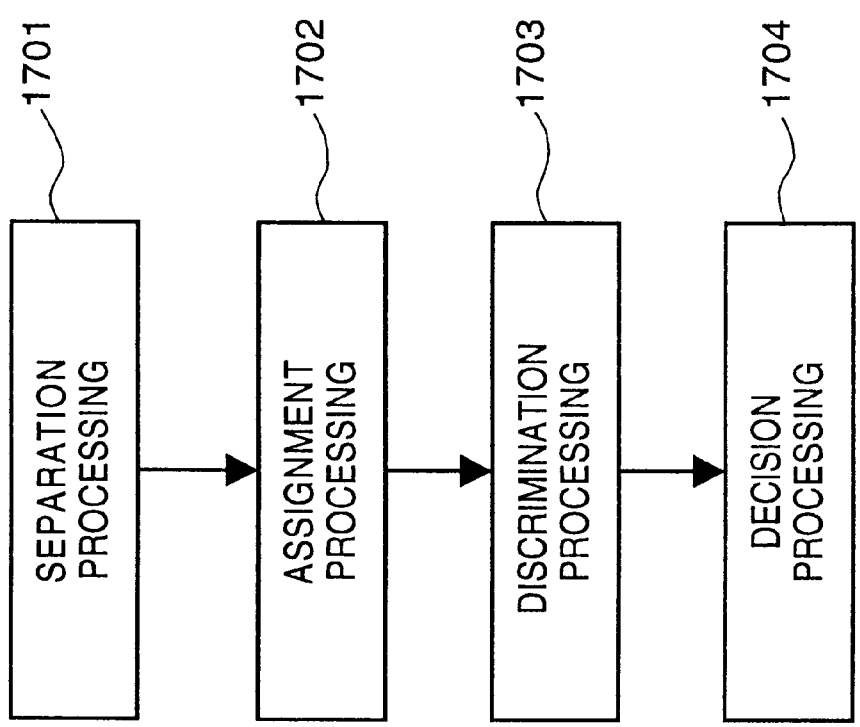

In FIG. 31A, separation processing is indicated at 1701. This is processing for separating entered document image data into a plurality of partial areas. Attribute assignment processing is indicated at 1702. According to this processing, it is determined to which of a plurality of types of attributes provided with degrees of priority in advance each of the plurality of partial areas obtained by the separation processing 1701 corresponds. The attribute determined is assigned to each partial area. This processing corresponds to step S2 in FIG. 2.

Discrimination processing 1703 is for discriminating document orientation with regard to each of the plurality of partial areas obtained by the separation processing 1701. This is processing corresponding to step S12 in FIG. 3. Decision processing 1704 is for deciding orientation of the document image data based upon the document orientation of each partial area discriminated by the discrimination processing and the degree of priority of the attribute assigned to each partial area. This is processing corresponding to steps S15~S20 in FIG. 3.

FIG. 31B is a diagram illustrating a memory map in a case where the program modules for executing the above-mentioned processing have been stored on a storage medium. A separation processing module 1701', assignment processing module 1702', discrimination processing module 1703' and decision processing module 1704' are program modules which execute the separation processing 1701, assignment processing 1702, discrimination processing 1703 and decision processing 1704.

The structural features of the program according to the second embodiment of the invention are as illustrated in FIG. 32.

In FIG. 32A, extraction processing 1801 is for extracting a plurality of partial areas from entered document image data. This is processing corresponding to steps S41~S43 in FIG. 9. Discrimination processing 1802 is for discriminating orientation with regard to the partial areas extracted by the extraction processing 1801. This is processing corresponding to steps S44, S47 in FIG. 9. In decision processing 1803, it is determined with the discriminated orientations match in a plurality of partial areas whose orientations have been discriminated by the discrimination processing to a predetermined degree of reliability or higher. This orientation is decided upon as the orientation of the document image data. This is processing corresponding to steps S46, S49 in FIG. 9 and step S50 in FIG. 10.

FIG. 32B is a diagram illustrating a memory map in a case where the program modules for executing the above-mentioned processing have been stored on a storage medium. A separation processing module 1801', discrimination processing module 1802' and decision processing module 1803' are program modules which execute the separation processing 1801, discrimination processing 1802 and decision processing 1803.

The structural features of the program according to the third embodiment of the invention are as illustrated in FIG. 33.

In FIG. 33A, extraction processing 1901 is for extracting a plurality of partial areas from entered document image data. This is processing corresponding to steps S61~S63 in FIG. 11. Discrimination processing 1902 is for discriminating document orientation with regard to each of the partial areas extracted by the extraction processing 1901. This is processing corresponding to step S64. Decision processing 1903 is for counting the number of times each document orientation has been discriminated by the discriminating means, and deciding upon a document orientation, for which the value of the count is maximum, as being the orientation of the document image data This is processing corresponding to steps S65, S67.

FIG. 33B is a diagram illustrating a memory map in a case where the program modules for executing the above-mentioned processing have been stored on a storage medium. An extraction processing module 1901', discrimination processing module 1902' and decision processing module 1903' are program modules which execute the extraction processing 1901, discrimination processing 1902 and decision processing 1903.

The structural features of the program according to the fourth embodiment of the invention are as illustrated in FIG. 34.

Figure 34B:
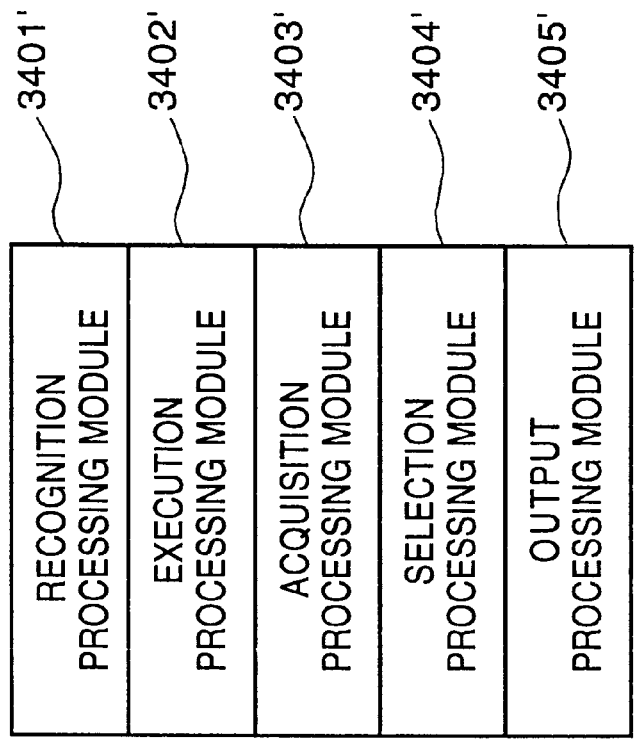
FIGS. 34A, B are diagrams illustrating the structure of the memory map of a storage medium storing program codes for implementing the fourth embodiment of the invention.
Figure 34A:
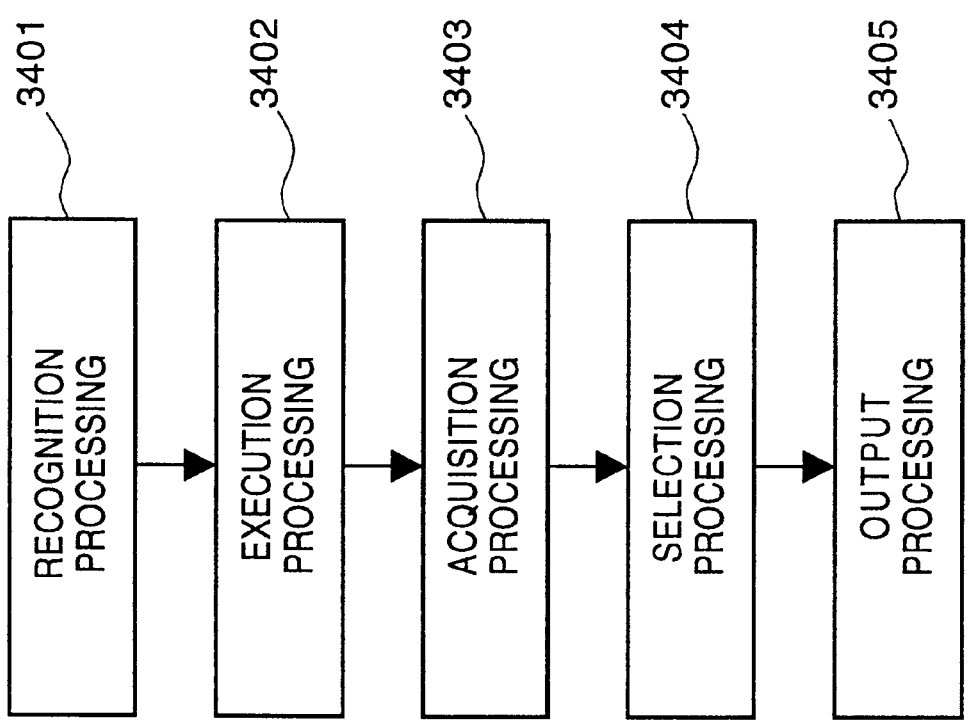

In FIG. 34A, recognition processing 3401 is for recognizing characters used in each of a plurality of languages. Execution processing 3402 applies the recognition of characters by the recognition processing 3401 to entered image data. Acquisition processing 3403 is for acquiring the recognition rate of each result of recognition obtained by recognition of characters executed by the execution processing 3402. This is processing corresponding to steps S1101~S1106 of FIG. 14. Selection processing 3404 is for selecting any one of a plurality of recognition results, which have been acquired by the acquisition processing 3403, based upon each recognition rate. This is processing corresponding to step S1008 of FIG. 14. Output processing 3405 is for outputting the result of recognition selected by the selection processing 3404. This is processing corresponding to steps S1109, S1110 of FIG. 14.

FIG. 34B is a diagram illustrating a memory map in a case where the program modules for executing the above-mentioned processing have been stored on a storage medium. A recognition processing module 3401', execution processing module 3402', acquisition processing module 3403', selection processing module 3404' and output processing module 3405' are program modules which execute the recognition processing 3401, execution processing 3402, acquisition processing 3403, selection processing 3404 and output processing 3405.

The structural features of the program according to the fifth embodiment of the invention are as illustrated in FIG. 35.

Figure 35B:
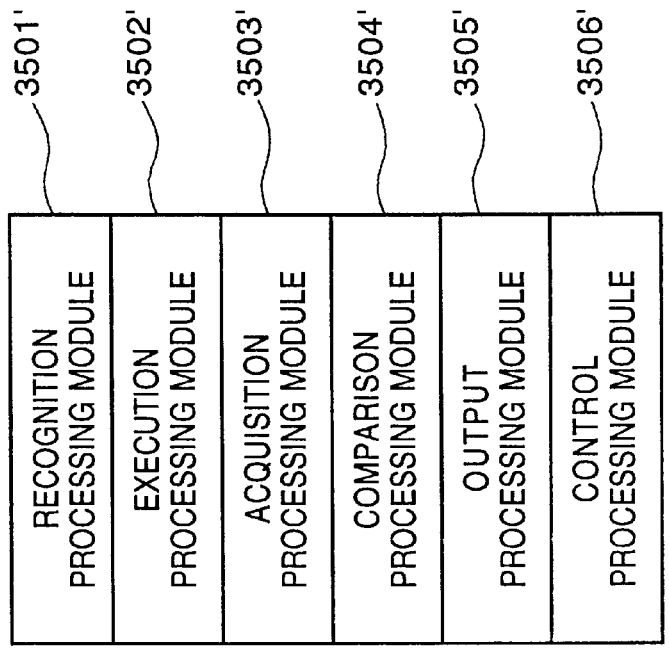
FIGS. 35A, B are diagrams illustrating the structure of the memory map of a storage medium storing program codes for implementing the fifth embodiment of the invention.
Figure 35A:
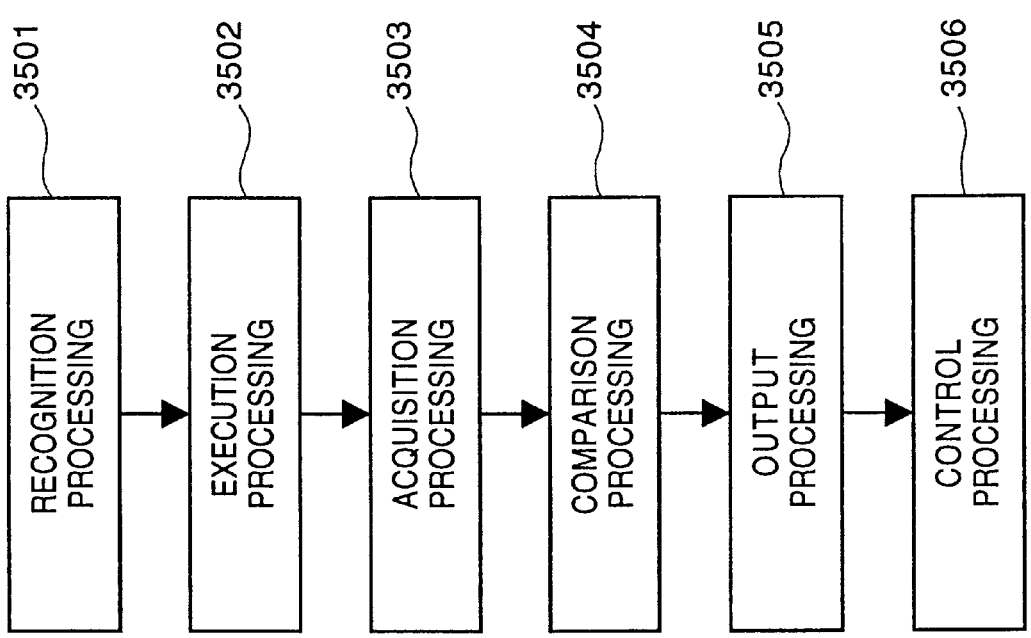

In FIG. 35A, recognition processing 3501 is for recognizing characters used in each of a plurality of languages. Execution processing 3502 is for selecting any one language in the recognition processing 3501 and applying recognition of the characters in this language to the entered image data. Acquisition processing 3503 is for acquiring the recognition rate of each result of recognition obtained by recognition of characters executed by the execution processing 3502. This is processing corresponding to steps S15101~S1503 of FIG. 25. Comparison processing 3504 is for comparing the recognition rate of the results of recognition acquired by the acquisition processing 3503 with a predetermined threshold value. This corresponds to step S1504 in FIG. 25. Output processing 3505 is for outputting results of recognition based upon the results of comparison in comparison processing 3504. This corresponds to step S1505 in FIG. 25. Control processing 1506 is for performing control in such a manner that the any one language is successively switched and selected and recognition of the characters in this language is applied to the entered image data in the recognition processing 3501 until an output is produced by the output processing 3505. This corresponds to steps S1506~S1510 in FIG. 25.

FIG. 35B is a diagram illustrating a memory map in a case where the program modules for executing the above-mentioned processing have been stored on a storage medium. A recognition processing module 3501', execution processing module 3502', acquisition processing module 3503', comparison processing module 3504', output processing module 3505' and control processing module 3506' are program modules which execute the recognition processing 3501, execution processing 3502, acquisition processing 3503, comparison processing 3504, output processing 3505 and control processing 3506.

As many apparently widely different embodiments of the present invention can be made without departing from the spirit and scope thereof, it is to be understood that the invention is not limited to the specific embodiments thereof except as defined in the appended claims.

What is claimed is:

1. An apparatus for discriminating document orientation, comprising:
    separating means for separating entered document image data into a plurality of partial areas;
    attribute discriminating means for discriminating to which of a plurality of types of attributes each of the plurality of partial areas obtained by said separation processing means corresponds, and assigning the attribute discriminated to each partial area;
    character orientation discriminating means for discriminating orientation of characters contained in each of the plurality of partial areas obtained by said separating means;
    selection means for selecting a partial area assigned an attribute of highest priority from among each of the plurality of partial areas; and
    deciding means for deciding orientation of the document image data based upon the discriminated character orientation of the partial area selected by said selection means.

2. The apparatus according to claim 1, wherein said character orientation discriminating means extracts a plurality of characters contained in a partial area whose orientation is to be discriminated, subjects each character to character recognition from a plurality of directions and adopts the direction for which degree of recognition is highest as the orientation of this partial area.

3. The apparatus according to claim 1, wherein if there is agreement among results of discriminating document orientation in a plurality of partial areas having attributes with the highest degrees of priority, said deciding means decides upon this document orientation as the orientation of the document image data.

4. The apparatus according to claim 1, wherein the plurality of attributes include an attribute indicative of a character area in main body of text, an attribute indicative of a character area in a table, an attribute indicative of a character area in a title, and an attribute indicative of a character area for the purpose of explaining a figure.

5. The apparatus according to claim 3, wherein the attribute indicative of a character area in main body of text is adopted as an attribute having the highest degree of priority.

6. The apparatus according to claim 3, wherein the attribute indicative of the character area in a title is adopted as an attribute having the highest degree of priority.

7. The apparatus according to claim 1, wherein said deciding means, in a case where the discriminated orientations agree in a plurality of characters whose orientations have been discriminated by said character orientation discriminating means to a predetermined reliability or higher, further decides upon this orientation as the orientation of the document image data.

8. The apparatus according to claim 7, wherein
said predetermined reliability or higher is that for which the maximum value of degree of character recognition from a plurality of directions, performed on said plurality of characters, was obtained.

9. The apparatus according to claim 1, wherein said deciding means counts a number of times discrimination could be performed by said character orientation discriminating means with regard to each character orientation, and further decides upon a character orientation, for which the value of the count is maximum, as being the orientation of the document image data.

10. The apparatus according to claim 9, wherein said character orientation discriminating means subjects characters to recognition processing from a plurality of directions and adopts the direction for which degree of recognition is highest as the orientation of this character.

11. A method of discriminating document orientation, comprising:
   a separating step of separating entered document image data into a plurality of partial areas;
   an attribute discriminating step of discriminating to which of a plurality of types of attributes each of the plurality of partial areas obtained in said separation step corresponds, and assigning the attribute discriminated to each partial area;
   a character orientation discriminating step of discriminating orientation of characters contained in each of the plurality of partial areas obtained in said separating step;
   a selection step of selecting a partial area assigned an attribute of highest priority from among each of the plurality of partial areas; and
   a deciding step of deciding orientation of the document image data based upon the discriminated character orientation of the partial area selected in said selection step.

12. The method according to claim 11, wherein said deciding step, in a case where the discriminated orientations agree in a plurality of characters whose orientations have been discriminated in said character orientation discriminating step to a predetermined reliability or higher, includes further deciding upon this orientation as the orientation of the document image data.

13. The method according to claim 12, wherein said deciding step includes counting a number of times discrimination could be performed in said character orientation discriminating step with regard to each character orientation, and further deciding upon a document orientation, for which the value of the count is maximum, as being the orientation of the document image data.

14. A computer readable memory storing program codes for processing for discriminating document orientation, said memory comprising:
   a program code of a separating step of separating entered document image data into a plurality of partial areas;
   a program code of an attribute discriminating step of discriminating to which of a plurality of types of attributes each of the plurality of partial areas obtained in said separation processing step corresponds, and assigning the attribute discriminated to each partial area;
   a program code of a character orientation discriminating step of discriminating orientation of characters contained in each of the plurality of partial areas obtained in said separating step;
   a program code of a selection step of selecting a partial area assigned an attribute of highest priority from among each of the plurality of partial areas; and
   a program code of a deciding step of deciding orientation of the document image data based upon the discriminated character orientation of the partial area selected in said selection step.

15. The computer readable memory according to claim 14, wherein said program code of the deciding step codes for, in a case where the discriminated orientations agree in a plurality of characters whose orientations have been discriminated in said character orientation discriminating step to a predetermined reliability or higher, further deciding upon this orientation as the orientation of the document image data.

16. The computer readable memory according to claim 14, wherein said program code of the deciding step codes for counting a number of times discrimination could be performed in said character orientation discriminating step with regard to each character orientation, and further deciding upon a document orientation, for which the value of the count is maximum, as being the orientation of the document image data.

* * * * *

UNITED STATES PATENT AND TRADEMARK OFFICE
CERTIFICATE OF CORRECTION

PATENT NO. : 6,137,905
DATED : October 24, 2000
INVENTOR(S) : Makoto Takaoka

Figure 4:
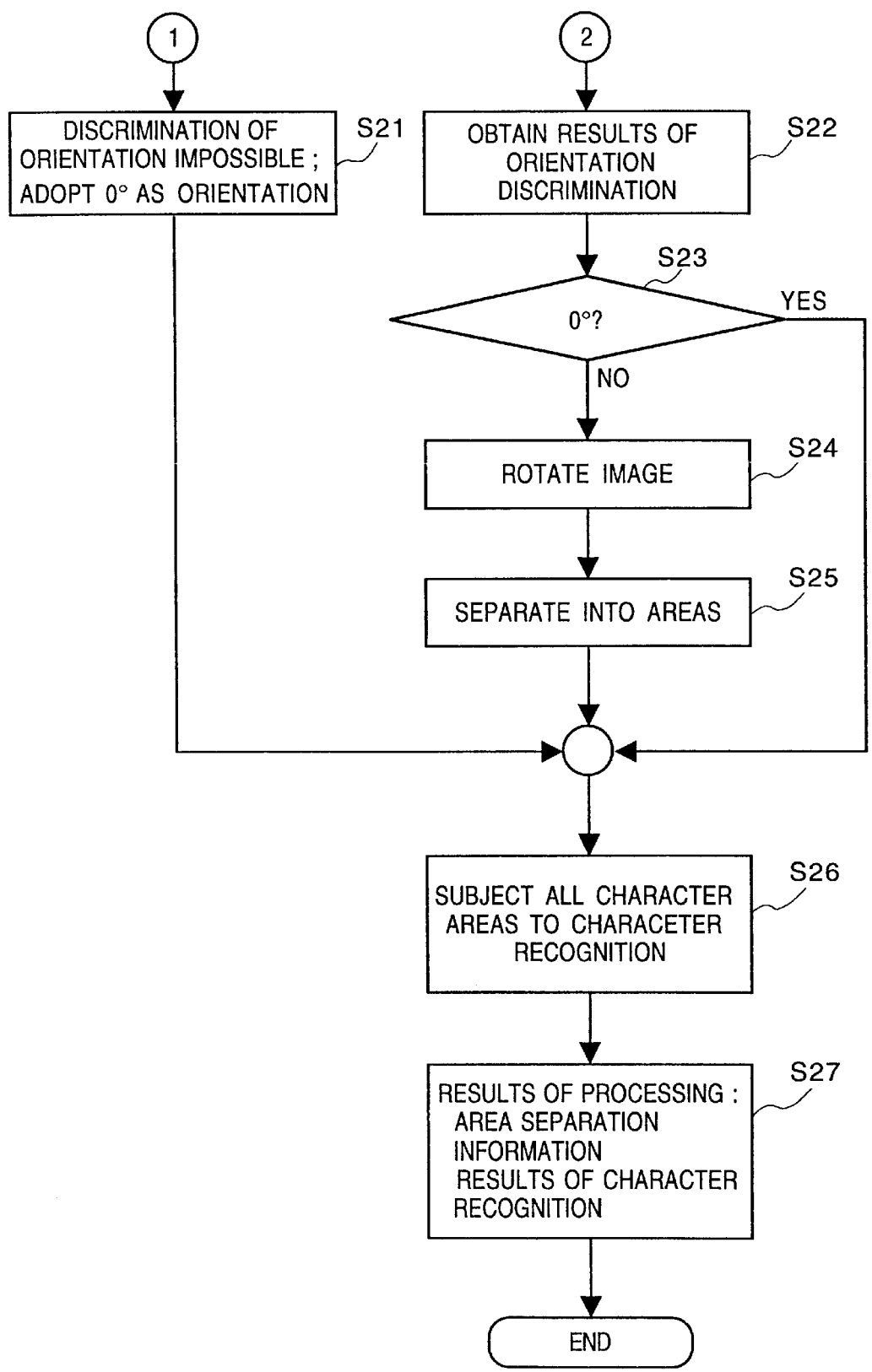
FIG. 4 is a flowchart illustrating the procedure of character recognition according to the first embodiment.

It is certified that error appears in the above-identified patent and that said Letters Patent is hereby corrected as shown below:

Drawings,
Sheet 4, figure 4, "CHARACETER" should read -- CHARACTER --.
Sheet 15, figure 15A, "Firing" should read -- Filing --.

Column 15,
Line 64, "their" should read -- there --.

Column 18,
Line 39, "an" should read -- a --.

Column 21,
Line 9, "regard" should read -- regard to --; and
Line 34, "store" should read -- stored --.

Column 24,
Lines 63 and 65, "steep" should read -- step --.

Column 25,
Line 36, "On the other than" should read -- On the other hand --.

Column 34,
Line 3, "claim 12," should read -- claim 11, --.

Signed and Sealed this

Twenty-ninth Day of January, 2002

Attest:

*Attesting Officer*

JAMES E. ROGAN
*Director of the United States Patent and Trademark Office*